United States Patent
Powell et al.

(10) Patent No.: US 11,970,782 B2
(45) Date of Patent: Apr. 30, 2024

(54) METHOD OF ALUMINUM-SCANDIUM ALLOY PRODUCTION

(71) Applicant: INFINIUM, INC., Natick, MA (US)

(72) Inventors: Adam Clayton Powell, Newton, MA (US); Matthew R. Earlam, Lakewood, CO (US); Salvador A. Barriga, Cambridge, MA (US); Richard Salvucci, Stoughton, MA (US); Brian Hunt, Woburn, MA (US)

(73) Assignee: FEA Materials LLC, New York, NY (US)

(*) Notice: Subject to any disclaimer, the term of this patent is extended or adjusted under 35 U.S.C. 154(b) by 678 days.

(21) Appl. No.: 16/980,957

(22) PCT Filed: Mar. 15, 2019

(86) PCT No.: PCT/US2019/022575
§ 371 (c)(1),
(2) Date: Sep. 15, 2020

(87) PCT Pub. No.: WO2019/178537
PCT Pub. Date: Sep. 19, 2019

(65) Prior Publication Data
US 2020/0407863 A1  Dec. 31, 2020

Related U.S. Application Data

(60) Provisional application No. 62/643,301, filed on Mar. 15, 2018.

(51) Int. Cl.
*C25C 3/00* (2006.01)
*C22C 21/00* (2006.01)
(Continued)

(52) U.S. Cl.
CPC ............ *C25C 3/36* (2013.01); *C22C 21/00* (2013.01); *C25C 7/02* (2013.01); *C25C 7/06* (2013.01)

(58) Field of Classification Search
CPC .. C25C 3/36; C25C 21/00; C25C 7/02; C25C 7/06
See application file for complete search history.

(56) References Cited

U.S. PATENT DOCUMENTS

| | | | |
|---|---|---|---|
| 3,111,467 A | 11/1963 | Vickery | |
| 5,037,608 A * | 8/1991 | Tarcy | .............. C22B 5/04 420/528 |

(Continued)

FOREIGN PATENT DOCUMENTS

| | | |
|---|---|---|
| CN | 1184356 | 12/2005 |
| CN | 100410400 | 8/2008 |

(Continued)

OTHER PUBLICATIONS

Extended European Search Report from European Patent Application No. 19767848.5 (national stage entry of PCT/US2019/22575) dated Nov. 16, 2021.

(Continued)

*Primary Examiner* — Zulmariam Mendez
(74) *Attorney, Agent, or Firm* — Mark S. Cohen; PEARL COHEN ZEDEK LATZER BARATZ LLP

(57) ABSTRACT

Disclosed methods relate to producing an aluminum-scandium (Al—Sc) alloy. A method can include providing an electrolyte bath comprising a first portion of at least one of $ScF_3$ or $AlF_3$ and a first portion of at least one of LiF, NaF, or KF; providing a cathode in electrical contact with the electrolyte bath; providing an anode in electrical contact with the electrolyte bath; adding a first portion of $Sc_2O_3$ into the electrolyte bath; reacting an aluminum ion with the cathode; applying an electric current to the cathode, thereby (Continued)

reacting a scandium ion with the cathode to produce the Al—Sc alloy.

18 Claims, 9 Drawing Sheets

(51) Int. Cl.
*C25C 3/36* (2006.01)
*C25C 7/02* (2006.01)
*C25C 7/06* (2006.01)

(56) References Cited

U.S. PATENT DOCUMENTS

| | | | |
|---|---|---|---|
| 6,045,631 | A | 4/2000 | Tarcy et al. |
| 11,186,897 | B2 | 11/2021 | Mann et al. |
| 2015/0232965 | A1 | 8/2015 | Sugita et al. |
| 2018/0087129 | A1 | 3/2018 | Mann et al. |

FOREIGN PATENT DOCUMENTS

| | | |
|---|---|---|
| CN | 106381408 A | 2/2017 |
| CN | 107502923 A | 12/2017 |
| CN | 107532317 A | 1/2018 |
| CN | 107557817 | 1/2018 |
| CN | 107557817 A | 1/2018 |
| EP | 2298944 | 8/2013 |
| EP | 3287548 A1 | 2/2018 |
| RU | 2213795 C1 | 10/2003 |
| RU | 2593246 C1 | 8/2016 |
| RU | 2621207 C1 | 6/2017 |
| WO | WO 2003/042418 | 5/2003 |
| WO | WO 2006/079353 | 8/2006 |
| WO | WO 2016/171584 A1 | 10/2016 |
| WO | WO2014/207834 A | 2/2017 |

OTHER PUBLICATIONS

Communication Pursuant to Rules 70(2) and 70a(2) EPC from European Patent Application No. 19767848.5 (national stage entry of PCT/US2019/22575) dated Dec. 3, 2021.
Office Action and Search Report from Chinese Patent Application No. 201980031681.9 (national stage entry of PCT/US2019/22575) dated Aug. 25, 2021 (and English translation).
Decision on the Grant of a Patent for an Invention (Notice of Allowance) re Russian Patent Application No. 2020133856 (national stage entry of PCT/US2019/22575) dated Aug. 18, 2022 (and English translation).
Office Action and Search Report from Chinese Patent Application No. 201980031681.9 (national stage entry of PCT/US2019/22575) dated Apr. 13, 2022 (and English translation).
Examination Report under Sections 12 & 13 of the Patents Act, 1970 and the Patents Rules, 2003 from Indian Application No. 202017044866 (national stage entry of PCT/US2019/22575) dated Jun. 28, 2022.
Zhang, Mingjie et al., "Preparation of Aluminum-scandium (Al—Sc) Alloys by Molten Salt Electrolysis," Journal of Northeastern University (Natural Science), vol. 24, No. 4, pp. 358-360, Apr. 2003.
AlSi10mg EOS Data Sheet, Electro Optical Systems (2014).
Bazhin, V.Y. et al., "Synthesis of Aluminum-Based Scandium-Yttrium Master Alloys," Russian Metallurgy (Metally) 2015(7) (2015): 516-520.

Bedinger, George M., "Titanium", U.S. Geological Survey Minerals Yearbook 2016, http://minerals.usgs.gov/minerals/pubs/commodity/titanium/mcs-2016-titan.pdf.
Fujii, Hidenori et al., "Al—Sc Master Alloy Prepared by Mechanical Alloying of Aluminum with Additions of $Sc_2O_3$," Mater. Trans. 44(5) (2003): 1049-1052.
Gschneider, K. A. et al., "The Al—Sc (Aluminum-Scandium) System," Bulletin of Alloy Phase Diagrams 10.1 (1989): 34-36.
Guan, C. Y. et al., "Preparing Aluminum-Scandium Alloys Using Direct Hall Reduction Process," 3rd International Symposium on High-Temperature Metallurgical Processing, John Wiley & Sons Inc Orlando, 2012, pp. 243-250.
Harata, Masanori et al., "Electrochemical Production of Al—Sc Alloy in $CaCl_2$—$Sc_2O_3$ Molten Salt," Journal of Alloys and Compounds 474.1-2 (2009): 124-130.
Harata, Masanori et al., "Production of Scandium and Al—Sc Alloy by Metallothermic Reduction," Adv. Proc. Metals Mater. 4:155, 2006.
Harata, Masanori et al., "Production of Scandium and Al—Sc Alloy by Metallothermic Reduction," Mineral Processing and Extractive Mettalurgy, 117(2) (2008): 95-99, 96.
International Preliminary Report on Patentability, International Search Report, and Written Opinion from PCT Patent Application No. PCT/US2019/22575 dated May 17, 2019.
Liu, Qiaochu et al., "Preparing Aluminium-Scandium Inter-Alloys During Reduction Process in KF—$ALF_3$—$SC_2O_3$ Melts," Light Metals 2012, Springer, Cham, 2012, pp. 685-689.
"RSP Technology RSA-501 AE Aluminum Super Alloy" on MatWeb Material Property Data, May 5, 2021, http://www.matweb.com/search/datasheet.aspx?matguid=436f7a56c98446778a8fb769dff7e99d.
Rui, Guo et al., "Preparation of Al—Sc Alloy by LiF—$ScF_3$—$ScCl_3$ Molten Salt Electrolysis," Materials Science Forum, vol. 675-677 (2011): 1125-1128.
Shtefanyuk, Yuriy et al., "Production of Al—Sc Alloy by Electrolysis of Cryolite-Scandium Oxide Melts," Light Metals 2015, Springer, Cham, 2015: 589-593, Abstract, p. 591.
Shubin, A. B. et al., "Thermodynamic Calculations of the Interaction of Scandium Halides with Aluminum," Russian Journal of Physical Chemistry A 84.12 (2010): 2011-2016.
Spedding, F. H., et al., "Preparation and Properties of High Purity Scandium Metal," Trans. Met. Soc. AIME 218 (1960): 608.
TIMETAL 6-4, 6-4 ELI & 6-4-.1Ru Data Sheet; Titanium Metals Corporation (2000).
Zaikov, Yuiry, et al., Lab Scale Synthesis of Al—Sc Alloys in NaF—$AlF_3$—$Al_2O_3$—$Sc_2O_3$ Melt, Advanced Materials Research, vol. 1088 (2015): 213-216.
Notice of Allowance (Decision of Patent) from Japanese Patent Application No. 2020-573087 (national stage entry of PCT/US2019/22575) dated Sep. 5, 2023.
Office Action from Japanese Patent Application No. 2020-573087 (national stage entry of PCT/US2019/22575) dated Jan. 17, 2023 (English translation).
Office Action from Japanese Patent Application No. 2020-573087 (national stage entry of PCT/US2019/22575) dated Jul. 11, 2023 (English translation).
Office Action and Search Report from Chinese Patent Application No. 201980031681.9 (national stage entry of PCT/US2019/22575) dated Sep. 27, 2022 (and English translation).
Decision of Rejection from Chinese Patent Application No. 201980031681.9 (national stage entry of PCT/US2019/22575) dated Feb. 25, 2023 (and English translation).
Xing, Zhenu et al., A Brief Review of Metallothermic Reduction Reactions for Materials Preparation, Small Methods 2018, 2.12, 1800062, pp. 1-13.

* cited by examiner

METHOD OF ALUMINUM-SCANDIUM ALLOY PRODUCTION

CROSS-REFERENCE TO RELATED APPLICATIONS

This application is a U.S. national stage application under 37 U.S.C. 371 of PCT International Application PCT/US2019/022575, filed Mar. 15, 2019, which claims priority to U.S. Provisional Application Ser. No. 62/643,301, filed on Mar. 15, 2018, the priority of which is hereby claimed, the contents of each of which is hereby incorporated by reference in its entirety.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

FIELD OF THE INVENTION

Embodiments of the invention relate to production of aluminum-scandium alloys.

BACKGROUND

Scandium (Sc) can be one of the preferred strengtheners for aluminum alloys per mole of alloy addition. Scandium-aluminum ($Al_3Sc$) coherent precipitates can be very fine and stable at high temperature, making these alloys suited for welding or sintering, such as in 3-D printing. For example, Scalmalloy® is AP Work's scandium-magnesium-aluminum alloy with a yield stress of about 525 MPa (RSP Technology RSA-501 AE on MatWeb; herein incorporated by reference in its entirety), which can be twice the yield stress of leading powder alloy AlSi10Mg (AlSi10Mg EOS data sheet; herein incorporated by reference in its entirety). The strength-density ratio ($\sigma y/\rho$) of sintered Scalmalloy® powder at $1.94 \times 10^5$ $m^2/s^2$ can be 20% higher than that of sintered Ti-6-4 powder (Ti-6-4 data sheet by Global Titanium Inc.; herein incorporated by reference in its entirety). Tensile and bending stiffness/density ($E/\rho$ and $E^{1/3}/\rho$) of Scalmalloy® can be 3% and 40% higher, respectively, than titanium alloys.

Scandium metal is expensive at about \$3,300/kg (market price in 2016), but many alloys can benefit from just about 0.2 weight % (wt %) of scandium. Low scandium solubility in aluminum can lead to commercial master alloy composition of Al—Sc alloys with 2 weight % scandium (Al-2 wt % Sc) with the market price of about \$100-115/kg. Although scandium is more abundant than lead in the Earth's crust, it is dispersed and can be hard to isolate, such that worldwide production of scandium oxide ($Sc_2O_3$) is only about 10 tonnes per year (TPY). $Sc_2O_3$ is one of the lowest-cost forms of scandium widely available in the market today. For example, the cost of $Sc_2O_3$ is about \$1200/kg (market price in 2016), and the cost of scandium fluoride ($ScF_3$) is about \$2947/kg (market price in 2016). That said, multiple new mines are under construction or in planning stages with a prediction of up to 450 TPY $Sc_2O_3$ production by year 2027. Such predicted increase in $Sc_2O_3$ production may decrease the price of scandium and enable up to 150,000 TPY of Al-0.2% Sc alloy production. Therefore, there is a need for an improved method and apparatus for producing aluminum-scandium (Al—Sc) alloys.

BRIEF SUMMARY OF THE INVENTION

Methods of producing an aluminum-scandium (Al—Sc) alloy are provided. In some embodiments, a method for producing an Al—Sc alloy can include (a) providing an electrolyte bath comprising a first portion of at least one of $ScF_3$ or $AlF_3$ and a first portion of at least one of LiF, NaF, or KF; (b) providing a cathode in electrical contact with the electrolyte bath, wherein the cathode comprises aluminum; (c) providing an anode in electrical contact with the electrolyte bath; (d) adding a first portion of $Sc_2O_3$ into the electrolyte bath; (e) reacting an aluminum ion with the cathode; and (f) applying an electric current to the cathode, thereby reacting a scandium ion with the cathode to produce the Al—Sc alloy, wherein after reacting the scandium ion with the cathode: the electrolyte bath comprises $ScF_3$, $AlF_3$, and at least one of LiF, NaF, or KF, and the cathode comprises the aluminum and scandium.

In some embodiments, the Al—Sc alloy can comprise between about 5-12 weight % scandium.

In some embodiments, the Al—Sc alloy can comprise between about 8-12 weight % scandium.

In some embodiments, at least a portion of the aluminum and the scandium in the cathode is a liquid.

In some embodiments, the electric current to the cathode has a current density of about 0.2-1.0 $A/cm^2$.

In some embodiments, the method can further comprise maintaining a predetermined molar ratio of the scandium ion to the aluminum ion of about 0:1 to about 2:1, wherein the predetermined ratio is maintained by controlling the electric current to the cathode.

In some embodiments, the method can further comprise maintaining a predetermined molar ratio of an oxygen ion to a fluoride ion of about 1:20 to about 1:250, wherein the predetermined ratio of the oxygen ion to the fluoride ion is maintained by controlling the electric current, or adding a second portion of $Sc_2O_3$ into the electrolyte bath.

In some embodiments, the method can further comprise maintaining a predetermined molar ratio of a lithium ion to the scandium ion and the aluminum ion of about 0.5:1 to about 4:1, wherein the predetermined molar ratio is maintained by adding a second portion of LiF.

In some embodiments, the method can further comprise maintaining a predetermined molar ratio of a sodium ion to the scandium ion and the aluminum ion of about 0.5:1 to about 6:1, wherein the predetermined molar ratio is maintained by adding a second portion of NaF.

In some embodiments, the method can further comprise maintaining a predetermined molar ratio of a potassium ion to the scandium ion and the aluminum ion of about 0.5:1 to about 6:1, wherein the predetermined molar ratio is maintained by adding a second portion of KF.

In some embodiments, the method can further comprise adding a second portion of $Sc_2O_3$, $AlF_3$, and a second portion of at least one of LiF, NaF, or KF into the electrolyte bath.

In some embodiments, the method can further comprise second portion of $Sc_2O_3$, $AlF_3$, and the second portion of at least one of LiF, NaF, or KF are added such that the electrolyte bath comprises about 17-38 weight % $ScF_3$, about 15-28 weight % $AlF_3$, about 43-55 weight % NaF, and about 1-5 weight % $Sc_2O_3$.

In some embodiments, the method can further comprise the second portion of $Sc_2O_3$, $AlF_3$, and the second portion of at least one of LiF, NaF, or KF are added such that the electrolyte bath comprises about 22-45 wt % ScF$_3$, about 18-33 wt % AlF$_3$, about 31-43 wt % LiF, and about 1-6 wt % Sc$_2$O$_3$.

In some embodiments, the method can further comprise the second portion of Sc$_2$O$_3$, AlF$_3$, and the second portion of at least one of LiF, NaF, or KF are added such that the electrolyte bath comprises about 14-32 wt % ScF$_3$, about 12-24 wt % AlF$_3$, about 51-63 wt % KF, and about 1-5 wt % Sc$_2$O$_3$.

In some embodiments, the method can further comprise adding a second portion of Sc$_2$O$_3$, ScF$_3$, AlF$_3$, and a second portion of at least one of LiF, NaF, or KF into the electrolyte bath.

In some embodiments, the second portion of Sc$_2$O$_3$, ScF$_3$, AlF$_3$, and the second portion of at least one of LiF, NaF, or KF are added such that the electrolyte bath comprises about 17-38 weight % ScF$_3$, about 15-28 weight % AlF$_3$, about 43-55 weight % NaF, and about 1-5 weight % Sc$_2$O$_3$.

In some embodiments, the second portion of Sc$_2$O$_3$, ScF$_3$, AlF$_3$, and the second portion of at least one of LiF, NaF, or KF are added such that the electrolyte bath comprises about 22-45 wt % ScF$_3$, about 18-33 wt % AlF$_3$, about 31-43 wt % LiF, and about 1-6 wt % Sc$_2$O$_3$.

In some embodiments, the second portion of Sc$_2$O$_3$, ScF$_3$, AlF$_3$, and the second portion of at least one of LiF, NaF, or KF are added such that the electrolyte bath comprises about 14-32 wt % ScF$_3$, about 12-24 wt % AlF$_3$, about 51-63 wt % KF, and about 1-5 wt % Sc$_2$O$_3$.

BRIEF DESCRIPTION OF THE SEVERAL VIEWS OF THE DRAWINGS

The following figures are illustrative only and are not intended to be limiting.

DETAILED DESCRIPTION

Described herein are methods and apparatuses useful for producing aluminum-scandium (Al—Sc) alloys.

Producing Al—Sc alloys can involve scandium fluoride (ScF$_3$). For example, ScF$_3$ can react with Al to produce AlF$_3$ and Al—Sc alloys (Trans. Met. Soc. AIME 218:608, 1960; Russ. J. Phys. Chem. A. 84(12):2011-2016, 2010; herein incorporated by reference in their entirety). But in some instances, ScF$_3$ can be more expensive than Sc$_2$O$_3$ (e.g., on a scandium basis, or on per unit scandium), which can increase the cost of producing Al—Sc alloys.

Producing Al—Sc alloys can involve aluminum powders. For example, aluminum powders can be mixed with Sc$_2$O$_3$ and pressed into pellets. These pellets, for example, can be immersed into liquid aluminum to produce Al—Sc alloys. Scandium reduction yield using such aluminum power process can be inconsistent, for example, depending on the pellet forming conditions. (U.S. Pat. No. 6,045,631; herein incorporated by reference in their entirety).

Figure 1:
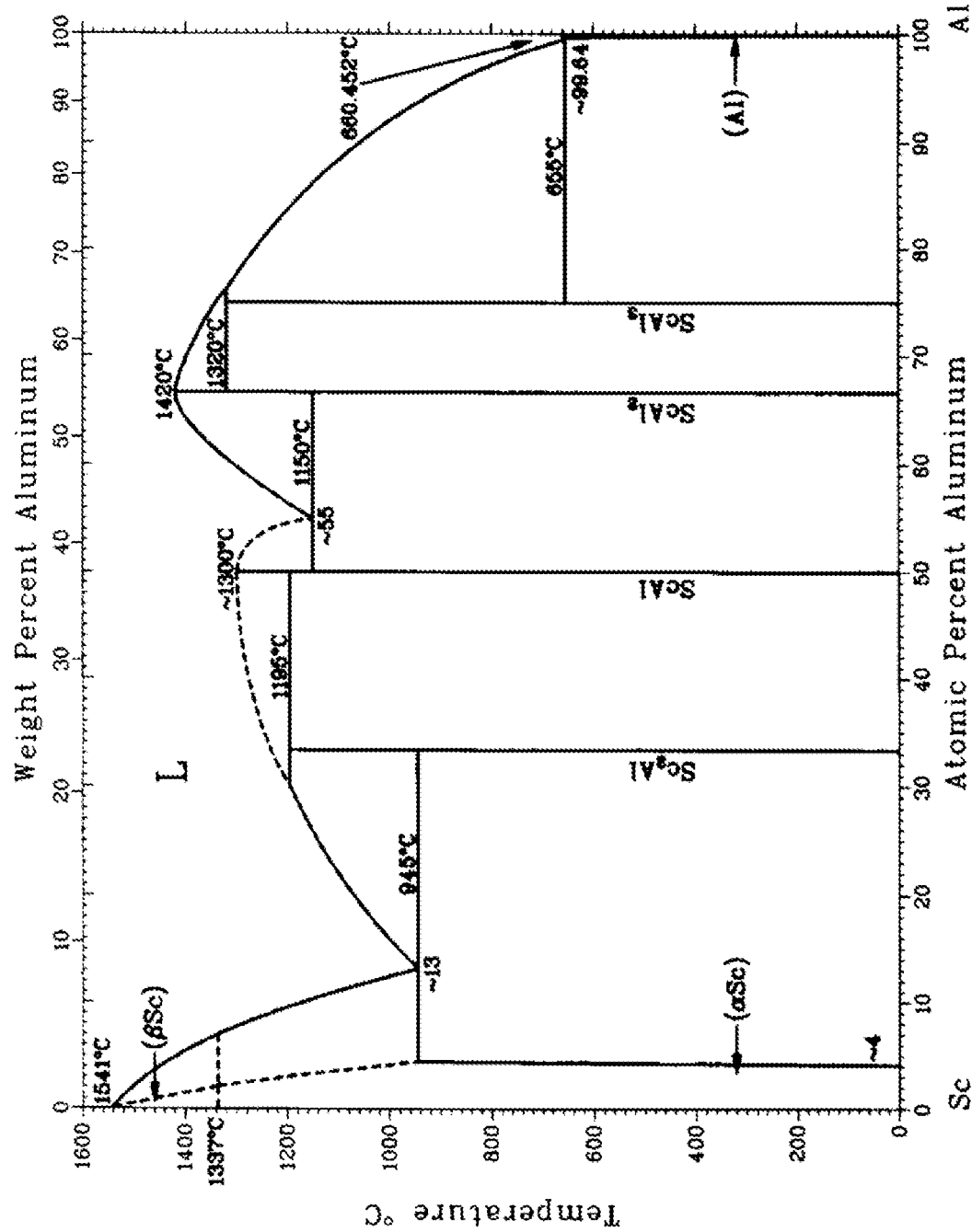
FIG. 1 shows an aluminum-scandium phase diagram according to embodiments of the present disclosure.

Producing Al—Sc alloys can also involve dissolving scandium metal in aluminum, but such dissolution can be slow, and the yield can be irregular due to the relatively high melting point of scandium which can lead to possible formation of a set of high-melting intermetallic compounds at the interface, which act as barrier layers preventing dissolution. FIG. 1 shows the Al—Sc phase diagram, illustrating these points.

Producing Al—Sc alloys can also involve an electrolytic reduction. For example, an electrolysis can be performed to reduce mixtures of Al$_2$O$_3$ and Sc$_2$O$_3$ dissolved in sodium or potassium cryolite (AlF$_3$—NaF or AlF$_3$—KF). Such electrolysis can produce Al—Sc alloys with about 0.5-1.5 weight % (wt %) Sc (CN Patent 1,184,356; WO 2006/079353; Chunyang Guan et al., 3rd Int'l Symp. High-Temp. Metall. Processing 2012; Qiaochu Liu et al., Light Metals 2012; herein incorporated by reference in their entirety). Electrolysis of Sc$_2$O$_3$ in CaCl$_2$) with an Al cathode can be performed to produced Al—Sc alloys with about 2 wt % Sc, but such electrolysis can also produce Al—Sc alloys with up to about 0.65 wt % calcium (J. Alloys Compounds 474:124-130, 2009; herein incorporated by reference in its entirety). But it can be less preferably to produce aluminum alloys with calcium content. Electrolysis of Sc$_2$O$_3$ dissolved in ScF$_3$—NaF can be performed to produce solid Sc metal granules (U.S. Pat. No. 3,111,467; herein incorporated by reference in its entirety). But, the Sc metal granules may need to be separated from the solid salt, and this additional step can be less desirable for commercialization purposes.

Producing Al—Sc alloys can involve using calcium vapor or alloy to reduce Sc$_2$O$_3$ into an Al alloy (Adv. Proc. Metals Mater. 4:155, 2006; Min. Proc. Extract. Metall. 117(2):96, 2008; herein incorporated by reference in their entirety). The resulting alloy can generally include about 1% or higher calcium content. But in some instances, it can be less desirable to produce aluminum alloys with calcium content.

Producing Al—Sc alloys can also involve using magnesium (Mg) as a possible reducing agent (U.S. Pat. No. 5,037,608; EP Patent 2,298,944; herein incorporated by reference in their entirety). For example, reacting Sc$_2$O$_3$ with an Al alloy with 15-17 wt % Mg can produce an aluminum-magnesium-scandium alloy with up to 2.5 wt % Sc. But this can result in Mg:Sc ratios that are less desirable, and the Mg content may need to be distilled out to achieve more desirable Mg:Sc ratios (Russian Metallurgy 2015(7): 516, 2015; herein incorporated by reference in its entirety).

Producing Al—Sc alloys can involve using NH$_4$HF$_2$ to convert Sc$_2$O$_3$ to fluoride in situ and react it with Al$_2$O$_3$, but such process can pose a health hazard (CN Patent 100,410, 400; herein incorporated by reference in its entirety). Producing Al—Sc alloys can further involve dissolving ScF$_3$ or Sc$_2$O$_3$ in chloride-fluoride salts, such as with AlF$_3$—NaF—KCl, but such process can result in low conversion yield from the oxide (WO 2003/042418; herein incorporated by reference in its entirety). Producing Al—Sc alloys can also involve mechanical alloying. For example, $Sc_2O_3$ can be first reduced with Al, then a ball milling followed by remelting can produce Al—Sc alloys. But this mechanical alloying process can be relatively slow and expensive (Mater. Trans. 44(4):1049, 2003; herein incorporated by reference in its entirety).

The above methods can generally fall into four categories: (1) use of $ScF_3$ (or its formation from $Sc_2O_3$ in situ), (2) reduction by Ca or Mg which remain in the alloy, (3) preparation of pressed metal-$Sc_2O_3$ powder pellets, or (4) electrolysis of $Al_2O_3$—$Sc_2O_3$ producing Al with a small amount of Sc. The latter option can result in high yield using low-cost $Sc_2O_3$, but at small scale, this can be a relatively expensive method for producing the large amount of aluminum in the alloy.

Methods of producing an aluminum-scandium (Al—Sc) alloy are provided. In some embodiments, a method for producing an Al—Sc alloy can include (a) providing an electrolyte bath comprising a first portion of at least one of $ScF_3$ or $AlF_3$ and a first portion of at least one of LiF, NaF, or KF; (b) providing a cathode in electrical contact with the electrolyte bath, wherein the cathode comprises aluminum; (c) providing an anode in electrical contact with the electrolyte bath; (d) adding a first portion of $Sc_2O_3$ into the electrolyte bath; (e) reacting an aluminum ion with the cathode; and (f) applying an electric current to the cathode, thereby reacting a scandium ion with the cathode to produce the Al—Sc alloy, wherein after reacting the scandium ion with the cathode: the electrolyte bath comprises $ScF_3$, $AlF_3$, and at least one of LiF, NaF, or KF, and the cathode comprises the aluminum and scandium.

In some embodiments, the Al—Sc alloy can comprise between about 5-12 weight % scandium.

In some embodiments, the Al—Sc alloy can comprise between about 8-12 weight % scandium.

In some embodiments, at least a portion of the aluminum and the scandium in the cathode is a liquid.

In some embodiments, the electric current to the cathode has a current density of about 0.2-1.0 $A/cm^2$.

In some embodiments, the method can further comprise maintaining a predetermined molar ratio of the scandium ion to the aluminum ion of about 0:1 to about 2:1, wherein the predetermined ratio is maintained by controlling the electric current to the cathode.

In some embodiments, the method can further comprise maintaining a predetermined molar ratio of an oxygen ion to a fluoride ion of about 1:20 to about 1:250, wherein the predetermined ratio of the oxygen ion to the fluoride ion is maintained by controlling the electric current, or adding a second portion of $Sc_2O_3$ into the electrolyte bath.

In some embodiments, the method can further comprise maintaining a predetermined molar ratio of a lithium ion to the scandium ion and the aluminum ion of about 0.5:1 to about 4:1, wherein the predetermined molar ratio is maintained by adding a second portion of LiF.

In some embodiments, the method can further comprise maintaining a predetermined molar ratio of a sodium ion to the scandium ion and the aluminum ion of about 0.5:1 to about 6:1, wherein the predetermined molar ratio is maintained by adding a second portion of NaF.

In some embodiments, the method can further comprise maintaining a predetermined molar ratio of a potassium ion to the scandium ion and the aluminum ion of about 0.5:1 to about 6:1, wherein the predetermined molar ratio is maintained by adding a second portion of KF.

In some embodiments, the method can further comprise adding a second portion of $Sc_2O_3$, $AlF_3$, and a second portion of at least one of LiF, NaF, or KF into the electrolyte bath.

In some embodiments, the method can further comprise second portion of $Sc_2O_3$, $AlF_3$, and the second portion of at least one of LiF, NaF, or KF are added such that the electrolyte bath comprises about 17-38 weight % $ScF_3$, about 15-28 weight % $AlF_3$, about 43-55 weight % NaF, and about 1-5 weight % $Sc_2O_3$.

In some embodiments, the method can further comprise the second portion of $Sc_2O_3$, $AlF_3$, and the second portion of at least one of LiF, NaF, or KF are added such that the electrolyte bath comprises about 22-45 wt % $ScF_3$, about 18-33 wt % $AlF_3$, about 31-43 wt % LiF, and about 1-6 wt % $Sc_2O_3$.

In some embodiments, the method can further comprise the second portion of $Sc_2O_3$, $AlF_3$, and the second portion of at least one of LiF, NaF, or KF are added such that the electrolyte bath comprises about 14-32 wt % $ScF_3$, about 12-24 wt % $AlF_3$, about 51-63 wt % KF, and about 1-5 wt % $Sc_2O_3$.

In some embodiments, the method can further comprise adding a second portion of $Sc_2O_3$, $ScF_3$, $AlF_3$, and a second portion of at least one of LiF, NaF, or KF into the electrolyte bath.

In some embodiments, the second portion of $Sc_2O_3$, $ScF_3$, $AlF_3$, and the second portion of at least one of LiF, NaF, or KF are added such that the electrolyte bath comprises about 17-38 weight % $ScF_3$, about 15-28 weight % $AlF_3$, about 43-55 weight % NaF, and about 1-5 weight % $Sc_2O_3$.

In some embodiments, the second portion of $Sc_2O_3$, $ScF_3$, $AlF_3$, and the second portion of at least one of LiF, NaF, or KF are added such that the electrolyte bath comprises about 22-45 wt % $ScF_3$, about 18-33 wt % $AlF_3$, about 31-43 wt % LiF, and about 1-6 wt % $Sc_2O_3$.

In some embodiments, the second portion of $Sc_2O_3$, $ScF_3$, $AlF_3$, and the second portion of at least one of LiF, NaF, or KF are added such that the electrolyte bath comprises about 14-32 wt % $ScF_3$, about 12-24 wt % $AlF_3$, about 51-63 wt % KF, and about 1-5 wt % $Sc_2O_3$.

In the present disclosure, producing Al—Sc alloys can involve reduction processes. In some embodiments, reduction processes of producing Al—Sc alloys described herein can involve an electrolytic reduction of $Sc_2O_3$ dissolved in a bath comprising at least one of $ScF_3$ and/or $AlF_3$, and at least one of LiF, NaF, and/or KF, where the bath is in an electrical contact with a cathode and an anode. In some embodiments, as an electrolytic reduction of $Sc_2O_3$ dissolved in the bath progresses, the bath can comprise $ScF_3$, $AlF_3$, and at least one of LiF, NaF, and/or KF. In some embodiments, the bath can comprise at least one of $ScF_3$ and/or $AlF_3$, and at least one of LiF, NaF, and/or KF, and optionally at least one of $MgF_2$, $CaF_2$ and/or $SrF_2$.

In some embodiments, a cathode described herein can comprise Al and can further comprise additional metals or electrical conductors such as Sc, $TiB_2$, C such as graphite, or any mixture thereof. In some embodiments, a cathode at the beginning of reduction processes can comprise any electrical conductor, such as Al, Sc, $TiB_2$, C such as graphite, or any mixture thereof. In some embodiments, a cathode at the beginning of reduction processes can comprise little or no Al and/or Sc, but as the reduction processes move forward, Al and/or Sc ions can be reduced onto the cathode, thereby forming the cathode comprising Al and Sc (e.g., Al—Sc alloy). In some embodiments, a cathode described herein can be in a liquid state or a solid state, or in any state in between. In some embodiments, an anode described herein can comprise any electrical conductor, such nickel ferrite, high-melting aluminum intermetallic such as aluminum-copper bronze, zirconium oxide, carbon such as graphite, or any mixture thereof. In some embodiments, an anode described herein can be in a liquid state or a solid state, or in any state in between.

In some embodiments, a bath comprising at least one of $ScF_3$ and/or $AlF_3$, and at least one of LiF, NaF, and/or KF can have varying ranges of compositions. In some embodiments, an approximate bath composition for an exemplary $ScF_3$—$AlF_3$—NaF bath with dissolved $Sc_2O_3$ can be about 17-38 wt % $ScF_3$, about 15-28 wt % $AlF_3$, about 43-55 wt % NaF, and about 1-5 wt % $Sc_2O_3$. In some embodiments, an approximate optimal bath composition for an exemplary $ScF_3$—$AlF_3$—NaF bath with dissolved $Sc_2O_3$ can be about 26.8 wt % $ScF_3$, about 24.6 wt % $AlF_3$, about 46.6 wt % NaF, and about 2 wt % $Sc_2O_3$.

In some embodiments, an approximate bath composition for an exemplary $ScF_3$—$AlF_3$—LiF bath with dissolved $Sc_2O_3$ can be about 22-45 wt % $ScF_3$, about 18-33 wt % $AlF_3$, about 31-43 wt % LiF, and about 1-6 wt % $Sc_2O_3$. In some embodiments, an approximate optimal bath composition for an exemplary $ScF_3$—$AlF_3$—LiF bath with dissolved $Sc_2O_3$ can be about 31.8 wt % $ScF_3$, about 29.3 wt % $AlF_3$, about 36.3 wt % LiF, and about 2.6 wt % $Sc_2O_3$.

In some embodiments, an approximate bath composition for an exemplary $ScF_3$—$AlF_3$—KF bath with dissolved $Sc_2O_3$ can be about 14-32 wt % $ScF_3$, about 12-24 wt % $AlF_3$, about 51-63 wt % KF, and about 1-5 wt % $Sc_2O_3$. In some embodiments, an approximate optimal bath composition for an exemplary $ScF_3$—$AlF_3$—KF bath with dissolved $Sc_2O_3$ can be about 21.9 wt % $ScF_3$, about 20.2 wt % $AlF_3$, about 56.0 wt % KF, and about 1.8 wt % $Sc_2O_3$. It will be appreciated that the use $ScF_3$—$AlF_3$—NaF bath, $ScF_3$—$AlF_3$—LiF bath, or $ScF_3$—$AlF_3$—KF bath with dissolved $Sc_2O_3$ have been selected for illustrative purposes and that in other embodiments and applications the bath may comprise $ScF_3$ and/or $AlF_3$ and any combination of NaF, LiF, and KF with dissolved $Sc_2O_3$ in varying ranges of compositions that can be similar or analogous to the composition ranges described herein.

In some embodiments, combined reduction processes described herein can directly use $Sc_2O_3$ at high yield, thereby minimizing raw material costs for producing Al—Sc alloys. For example, $Sc_2O_3$ can be used with a yield rate that can be as high as about 80-100%. In some embodiments, reduction processes described herein can be performed with lower electricity current and also with fewer and/or smaller cells when compared with process(es) that involve a reduction of all or most of the aluminum for the Al—Sc alloy production.

In some embodiments, reduction processes described herein can be performed with fewer number of process steps when compared with other Al—Sc alloy production processes described above. For example, reduction processes described herein can involve the following two steps: a reduction step of producing Al—Sc alloys, and casting the produced Al—Sc alloys in a mold. In comparison, some Al—Sc alloy production processes that involve Ca and/or Mg can result in the production of Al—Sc alloys with Ca and/or Mg content. Such processes using Ca and/or Mg, for example, can involve extra step(s) of removing/distilling the Ca and/or Mg content from the produced Al—Sc alloys. In another comparison, some Al—Sc alloy production processes can involve fluorination step(s) of reacting $Sc_2O_3$ with acid such as HF at high temperature to form $ScF_3$, and then reacting the produced $ScF_3$ with Al for the production of Al—Sc alloys. Such processes, for example, can involve extra fluorination step(s).

In some embodiments, combined reduction processes described herein can produce Al—Sc alloys with Sc content of about 0-12 wt %, about 1-12 wt % Sc, about 2-12 wt % Sc, about 3-12 wt % Sc, about 4-12 wt % Sc, about 5-12 wt % Sc, about 6-12 wt % Sc, about 8-12 wt % Sc, about 0-wt % Sc, about 1-10 wt % Sc, about 2-10 wt % Sc, about 3-10 wt % Sc, about 4-10 wt % Sc, about wt % Sc, about 6-10 wt % Sc, about 0-8 wt % Sc, about 1-8 wt % Sc, about 2-8 wt % Sc, about 3-8 wt % Sc, about 4-8 wt % Sc, and preferably about 5-8 wt % Sc. In some embodiments, combined reduction processes described herein can produce Al—Sc alloys with Sc content as high as about 12 wt % based on the combination of the following three factors. In some embodiments, one factor can be a concentration level of $ScF_3$ in the bath. For example, in some embodiments, high concentration level of $ScF_3$ in the bath can be one factor that can allow the production of Al—Sc alloys with high Sc content. In some embodiments, another factor can be temperature. For example, in some embodiments, high temperature can be one factor that can allow the production of Al—Sc alloys with high Sc content. As a reference, FIG. 1 shows an aluminum-scandium phase diagram, which indicates that at about 1 wt % Sc, the liquidus temperature can be about 700° C.; at about 2 wt % Sc, the liquidus temperature can be about 800° C.; and at about 12 wt % Sc, the liquidus temperature can be about 1,000° C. In some embodiments, another factor can be electric current density. For example, in some embodiments, high electric current density in the bath can be one factor that can allow the production of Al—Sc alloys with high Sc content.

In some embodiments, $AlF_3$ in a bath described herein can serve one or more purpose(s). In some embodiments, $AlF_3$ in the bath can balance or maintain the bath density. For example, $AlF_3$—$ScF_3$ bath with higher $AlF_3$ can reduce the bath density vs. higher $ScF_3$. In some embodiments, $AlF_3$ in the bath can help balance out the metallothermic reaction between $ScF_3$ in the bath and the Al cathode by providing Al ions for electrolytic reduction. In some embodiment, optionally, at least one of $MgF_2$, $CaF_2$ and/or $SrF_2$ can be added to a bath described herein, for example, to balance or maintain the bath's density.

In some embodiments, depending on the bath density, a cathode comprising Al and Sc can be submerged under the bath, or floating above the bath. For example, if the bath density is higher/denser than the cathode (e.g., cathode comprising liquid Al—Sc alloy) density, then the cathode can be floating above the bath. In another example, if the cathode (e.g., cathode comprising liquid Al—Sc alloy) density is higher/denser than the bath density, then the cathode can be submerged under the bath. In some embodiments, it may be preferable to keep the cathode submerged under the bath; in other embodiments, it may be preferable to keep the cathode floating above the bath.

Figure 2:
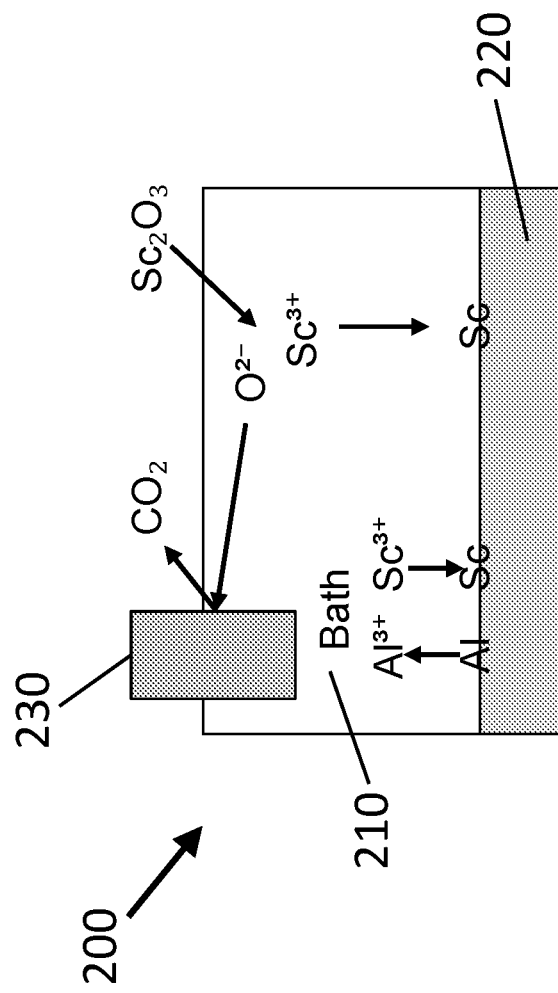
FIG. 2 shows a reduction cell for producing aluminum-scandium alloys according to embodiments of the present disclosure.

FIG. 2 shows a reduction cell (200) for producing aluminum-scandium (Al—Sc) alloys according to embodiments of the present disclosure. In some embodiments, the reduction cell (200) can produce Al—Sc alloys by starting with a bath (210) comprising $ScF_3$ and at least one of LiF, NaF, and/or KF. In some embodiments, a cathode (220) in FIG. 2, at the beginning of the process can comprise liquid aluminum, and an anode (230) in FIG. 2 can comprise carbon graphite. In some embodiments, as illustrated in FIG. 2, $Sc_2O_3$ can be added to the reduction cell (200) and reduced under metallothermic reduction to deposit $Sc^{3+}$ into the Al cathode (220), thereby producing an Al—Sc alloy of up to about 12 wt % Sc content. In some embodiments, as the metallothermic reduction continues, the overall Sc content in the bath (210) can decrease over time, for example, due to metallothermic reaction between $ScF_3$ originally in the bath and Al metal in the cathode. In some embodiments, $O^{2-}$ in the bath (210) can react with the anode (230), and if the anode (230) comprises carbon, the reaction can produce $CO_2$ gas.

In some embodiments, an Al—Sc alloy producing plant that can produce about 500 tonnes of Al—Sc alloys per year can reduce about 10 tonnes of scandium per year, which can require about 3000 Amperes total electric current, for example, across all cell(s). A similar plant with lower current efficiency and electrolysis utilization can require as much as about 7000 Amperes total electric current across all cell(s).

Figure 3:
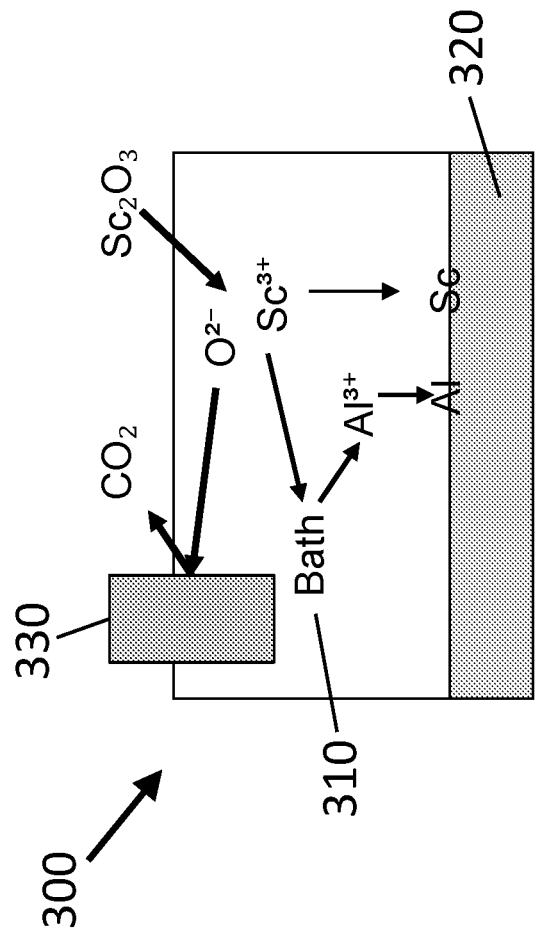
FIG. 3 shows another reduction cell for producing aluminum-scandium alloys according to embodiments of the present disclosure.

FIG. 3 shows a reduction cell (300) for producing aluminum-scandium (Al—Sc) alloys according to embodiments of the present disclosure. In some embodiments, the reduction cell (300) can produce Al—Sc alloys by starting with a bath (310) comprising $AlF_3$ and at least one of LiF, NaF, and/or KF. In some embodiments, a cathode (320) in FIG. 3, at the beginning of the process, can comprise little or no Al or Sc. In some embodiments, an anode (330) in FIG. 3 can comprise carbon graphite. In some embodiments, $Sc_2O_3$ can be added to the cell (300) and as the electrolysis continues to reduce Al along with Sc, the overall Sc content in the bath (310) can increase over time. for example, the feed oxide can be $Sc_2O_3$ and the electrolysis can consume some Al ions from the bath, so electrolysis can consume Sc at a slower rate than the feed rate of $Sc_2O_3$. In some embodiments, $O^{2-}$ in the bath can react with the anode (330), and if the anode (330) comprises carbon, the reaction can produce $CO_2$ gas. In some embodiments, the reduction process in the reduction cell (300) can be performed by using a standard aluminum production cell with little or no modification.

Figure 4:
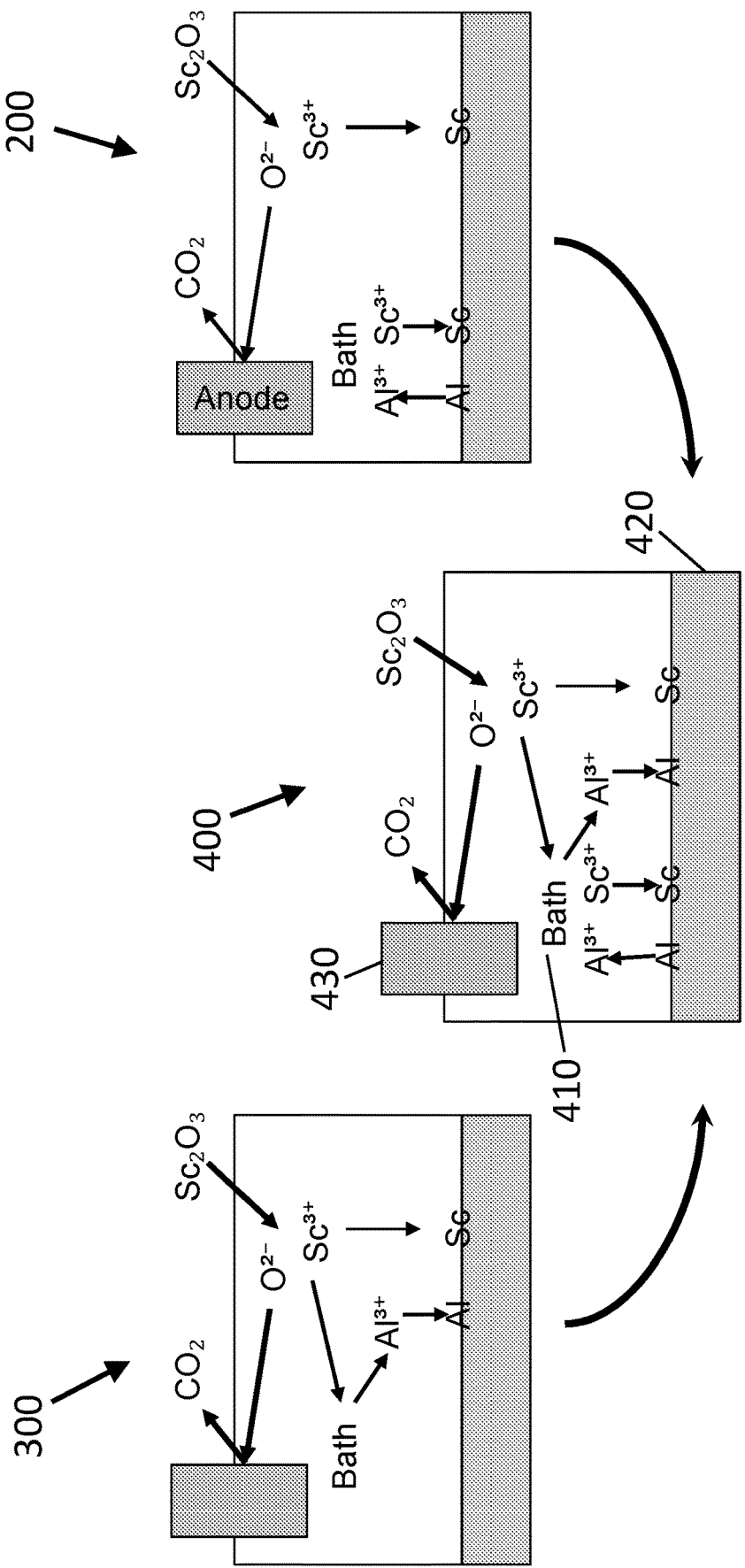
FIG. 4 shows a balanced reduction cell for producing aluminum-scandium alloys according to embodiments of the present disclosure.

FIG. 4 shows a balanced reduction cell (400) for producing aluminum-scandium alloys according to embodiments of the present disclosure. In some embodiments, as illustrate in the reduction cell (400) of FIG. 4, electrowinning processes illustrated in FIGS. 2 and 3 can be combined and balanced to produce Al—Sc alloys in a more preferred manner. In some embodiments, when compared with the process of electrowinning pure Sc into a cathode comprising aluminum, the combined and balanced process as illustrated in the reduction cell 400 can require more electric current and more production cells to produce substantially the same about of Al—Sc alloys with substantially the same Al and Sc content (or substantially the same ratio between Al and Sc).

In some embodiments, the reduction cell (400) can produce Al—Sc alloys by starting with a bath (410) comprising $ScF_3$ and/or $AlF_3$, and at least one of LiF, NaF, and/or KF. In some embodiments, the reduction cell (400) can produce Al—Sc alloys with up to about 12 wt % in Sc. In some embodiments, a cathode (420) in FIG. 4 can comprise aluminum that can be in a liquid state and an anode (430) in FIG. 4 can comprise carbon graphite. In some embodiments, as illustrate in FIG. 4, $Sc_2O_3$ can be added to the cell (400) and a reduction of $Sc_2O_3$ can co-reduce $Al_2O_3$ and $Sc_2O_3$ to produce Al—Sc alloys with about 99 wt % Sc to Al—Sc alloys with about 3 wt % Sc, and then into more diluted Al—Sc alloys with less Sc content. For example, this co-reduction approach can use an Al cathode (420) to dilute the Al—Sc alloys down to 2 wt % Sc in situ as it is produced, or can use separate Al dilution after reduction. In some embodiments, when producing Al—Sc alloys from aluminum and $Sc_2O_3$, with no addition of $Al_2O_3$ (e.g., feeding $Sc_2O_3$ without adding $Al_2O_3$), the aluminum fluxes due to metallothermic and electrolytic reactions can be balanced, such that there can be relatively little net aluminum transfer from bath to/from metal. The overall electrolytic reaction can be:

$$Al_2O_3(\text{bath}) + C(\text{anode}) \rightarrow 2Al(\text{metal}) + 3/2CO_2(\text{gas}) \quad (1)$$

And the metallothermic reaction can be:

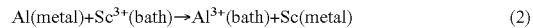

$$Al(\text{metal}) + Sc^{3+}(\text{bath}) \rightarrow Al^{3+}(\text{bath}) + Sc(\text{metal}) \quad (2)$$

In some embodiments, aluminum and scandium in the baths of reduction processes may not usually exist as oxide molecules or as in plain 3+ ions, but can exist as members of covalently-bonded complex anions or cations together with oxide or fluoride ions, and the aluminum and scandium within each complex ion can usually exist in the 3+ oxidation state. Therefore, in some embodiments, when the reduction cell (400) reaches rough steady-state, the time-averaged rate of aluminum cation electrolysis into the metal alloy can roughly be similar or equal to the time-averaged rate of aluminum cation migration from metal to the bath by metallothermic reaction.

In some embodiments, there can be several variables that can be balanced or maintained to achieve a constant bath composition (e.g., $ScF_3$—$AlF_3$—NaF bath with dissolved $Sc_2O_3$), for example, as illustrated in the reduction cell (400) of FIG. 4. In some embodiments, a substantially constant bath composition can facilitate a steady-state reduction production of Al—Sc alloys and help achieve a substantially consistent Al—Sc alloy product composition.

In some embodiments, an O:F anion ratio can be one variable that can be balanced or maintained to achieve a constant bath composition (e.g., $ScF_3$—$AlF_3$—NaF bath with dissolved $Sc_2O_3$). In some embodiments, the O:F anion molar ratio in the bath can be about 1:20 to about 1:250, about 1:40 to about 1:250, about 1:60 to about 1:250, about 1:60 to about 1:200, about 1:60 to about 1:150, and preferably about 1:60 to about 1:100, and preferably about 1:100. In some embodiments, fluoride content in the bath can be relatively constant, and oxygen content can change according to the balance between $Sc_2O_3$ feed rate and oxygen consumption at the anode. In some embodiments, a current decay at constant voltage and/or a voltage increase at constant current can serve as a control signal to indicate when and how much it may be desirable to change the feed rate.

In some embodiments, a Sc:Al cation ratio can be one variable that can be balanced or maintained to achieve a constant bath composition (e.g., $ScF_3$—$AlF_3$—NaF bath with dissolved $Sc_2O_3$). In some embodiments, the Sc:Al cation molar ratio in the bath can be about 0:1 to about 2:1, about 0.5 to about 1.5:1, and preferably about 1:1. In some embodiments, $Sc_2O_3$ feed rate and the relative rates of metallothermic and electrolytic reactions can control or maintain this ratio. In some embodiments, the $Sc_2O_3$ feed rate can be fixed and/or consistent. In some embodiments, the $Sc_2O_3$ feed rate can be in inconsistent, and the $Sc_2O_3$ can be added to the bath in burst(s). In some embodiments, the $Sc_2O_3$ feed rate can be adjusted/determined based on measurement of the oxide concentration in the bath. In some embodiments, an oxide concentration analyzer can be configured with the bath to send signals indicating the bath's oxide concentration, and the $Sc_2O_3$ can be added accordingly to regulated the Sc:Al cation ratio. In some embodiments, the $Sc_2O_3$ feed rate can be adjusted/determined based on overall scale of Al—Sc alloy production scale such as size of the reduction cell(s).

In some embodiments, as shown in FIG. 3, the metallothermic reaction can move Al from metal to bath, and Sc from bath to metal. The electrolytic reaction, for example, can move both from bath to metal. Therefore, increasing electric current, for example, can result in more electrolysis reaction relative to metallothermic, and less Sc in the bath relative to Al. In some embodiments, because Al can be more electronegative than Sc, increasing cathode current density can lead to higher ratio of reduced $Sc^{3+}$ to $Al^{3+}$ at the cathode, which can lead to less Sc in the bath than Al. Therefore, in some embodiments, electric current can be used to regulate the Sc:Al cation ratio. In some embodiments, electric current with density of at least 0.1 Amp/cm² (A/cm²), at least 0.2 A/cm², at least 0.3 A/cm², or preferably at least 0.4 A/cm² can be applied for the electrolytic reaction. In some embodiments, electric current with density of at least 0.5 A/cm², at least 0.6 A/cm², at least 0.7 A/cm², at least 0.8 A/cm², at least 0.9 A/cm², or at least 1.0 A/cm² can be applied for the electrolytic reaction. In some embodiments, electric current with density of about 0.1-3.0 A/cm², about 0.1-2.0 A/cm², about 0.1-1.0 A/cm², about 0.1-0.8 A/cm², about 0.1-0.6 A/cm², about A/cm², about 0.2-2.0 A/cm², about 0.2-1.0 A/cm², about 0.2-0.6 A/cm², about 0.3-3.0 A/cm², about 0.3-2.0 A/cm², about 0.3-1.0 A/cm², about 0.3-0.8 A/cm², about 0.3-0.6 A/cm², or preferably about 0.4 A/cm² can be applied for the electrolytic reaction. In some embodiments, the current efficiency, for example, of the electrolysis cell, or the overall Al—Sc alloy production operation, can be a factor for determining the optimal ranges of electrolysis current. In some embodiments, it may be desirable to apply an electric current that can produce Al—Sc alloy without producing CF4 or sludge layer(s). In some embodiments, controlling/balancing the ratio can be aided with a measurement of bath and/or metal composition, which can be done, for example, using X-Ray Fluorescence (XRF) or Laser-Induced Breakdown Spectroscopy (LIBS).

In some embodiments, a ratio of a sodium ion to a scandium ion and an aluminum ion (Na:(Sc+Al)) can be one variable that can be balanced or maintained to achieve a constant bath composition (e.g., $ScF_3$—$AlF_3$—NaF bath with dissolved $Sc_2O_3$). In some embodiment, the molar ratio Na:(Sc+Al) in the bath can be maintained at about 0.5:1 to about 6:1, at about 1:1 to about to 4:1, at about 1.5:1 to 3:1, and preferably at about 2:1. In some embodiments, like fluoride, sodium can be a relatively passive bystander, but it can leave the bath by evaporation more quickly than $ScF_3$ or $AlF_3$. Therefore, in some embodiments, keeping the ratio Na:(Sc+Al) in control/balance can involve feeding excess NaF, and measuring the bath composition.

In some embodiments, a ratio of a lithium ion to a scandium ion and an aluminum ion (Li:(Sc+Al)) can be one variable that can be balanced or maintained to achieve a constant bath composition (e.g., $ScF_3$—$AlF_3$—LiF bath with dissolved $Sc_2O_3$). In some embodiment, the molar ratio Li:(Sc+Al) in the bath can be maintained at about 0.5:1 to about 4:1, at about 1:1 to about to 3:1, at about 1.5:1 to 3:1, and preferably at about 2:1. In some embodiments, keeping the ratio Li:(Sc+Al) in control/balance can involve feeding excess LiF, and measuring the bath composition.

In some embodiments, a ratio of a potassium ion to a scandium ion and an aluminum ion (K:(Sc+Al)) can be one variable that can be balanced or maintained to achieve a constant bath composition (e.g., $ScF_3$—$AlF_3$—KF bath with dissolved $Sc_2O_3$). In some embodiment, the molar ratio K:(Sc+Al) in the bath can be maintained at about 0.5:1 to about 6:1, at about 1:1 to about to 4:1, at about 1.5:1 to 3:1, and preferably at about 2:1. In some embodiments, keeping the ratio K:(Sc+Al) in control/balance can involve feeding excess KF, and measuring the bath composition. It will be appreciated that the use the ratios Na:(Sc+Al), Li:(Sc+Al), and K:(Sc+Al) have been selected for illustrative purposes and that in other embodiments and applications, a ratio between any combination of Na, Li, and/or K to scandium ion and aluminum ion (Na, Li, K, or any combination thereof):(Sc+Al) with similar or analogous ratio ranges described herein.

In some embodiments, a bath content in the reduction cell (e.g., the reduction cell 400 in FIG. 4) can be one variable that can be balanced or maintained to achieve a constant bath composition (e.g., $ScF_3$—$AlF_3$—NaF bath with dissolved $Sc_2O_3$, $ScF_3$—$AlF_3$—LiF bath with dissolved $Sc_2O_3$, $ScF_3$—$AlF_3$—KF bath with dissolved $Sc_2O_3$, or $ScF_3$—$AlF_3$— any combination of Li, NaF, an KF bath with dissolved $Sc_2O_3$). As described herein, in some embodiments, the bath composition can be about 17-38 wt % $ScF_3$, about 15-28 wt % $AlF_3$, about 43-55 wt % NaF, and about 1-5 wt % $Sc_2O_3$; preferably about 26.8 wt % $ScF_3$, about 24.6 wt % $AlF_3$, about 46.6 wt % NaF, and about 2 wt % $Sc_2O_3$. In some embodiments, the bath composition can be about 22-45 wt % $ScF_3$, about 18-33 wt % $AlF_3$, about 31-43 wt % LiF, and about 1-6 wt % $Sc_2O_3$. In some embodiments, the bath composition can be about 14-32 wt % $ScF_3$, about 12-24 wt % $AlF_3$, about 51-63 wt % KF, and about 1-5 wt % $Sc_2O_3$. In some embodiments, evaporation and metal removal can decrease the total bath content and the level in the cell. In some embodiments, it may be possible to recover some of the bath taken out of the cell in product removal, for example, by collecting it in a manner that can prevent contamination and putting it back into the cell. In some embodiments, $AlF_3$, $Sc_2O_3$, NaF, LiF, and/or KF can be fed into the bath, generating $ScF_3$ in situ, to maintain the bath composition. In some embodiments, $AlF_3$, $ScF_3$, $Sc_2O_3$, NaF, LiF, and/or KF can be fed into the bath to maintain the bath volume and composition, balancing losses due to evaporation and metal removal.

In some embodiments, the cathode in FIG. 3, at the start of the process, can contain relatively less amount of aluminum when compared with the amount of aluminum in the cathode in FIG. 2, and both reduction cell 200 and reduction cell 300 can end with substantially the same amount of Al—Sc alloys being produced with substantially the same Al and Sc contents (or substantially the same Al:Sc ratio).

In some embodiments, the process in FIG. 2 can start and end with substantially the same amount of aluminum in the cathode, and Sc can be added (e.g., via combined reduction processes) into the preexisting aluminum in the cathode. For example, the process in FIG. 2 can start with about 98 grams of aluminum in the cathode (220), and about 2 grams of scandium can be added (e.g., via combined reduction processes) into the preexisting aluminum (e.g., about 98 grams) in the cathode (220), thereby producing about 100 grams of Al—Sc alloy with about 2% weight in scandium.

In some embodiments, the combined reduction processes in FIG. 3 can start with much less aluminum in the cathode at the start of the process, and the process can involve both Al and Sc being co-reduced to form an Al—Sc alloy at the cathode. For example, the process in FIG. 3 can start with little or no aluminum in the cathode (320), and about 98 grams of additional aluminum and about 2 grams of scandium can be added (e.g., via metallothermic and electrolytic reduction processes) into the cathode (330), thereby producing about 100 grams of Al—Sc alloy with about 2 wt % in scandium.

In some embodiments, the aluminum amount in the cathode in FIG. 4, at the start of the process, can be somewhere in between the amounts of aluminum for the combined reduction processes for FIGS. 2 and 3, and all three reduction cell 200, reduction cell 300, and reduction cell 400 can end with substantially the same amount of Al—Sc alloys with substantially the same Al and Sc contents (or substantially the same Al:Sc ratio). For example, the process in FIG. 3 can start with about 90 grams of aluminum in the cathode (420), and about 8 grams of additional aluminum and about 2 grams of scandium can be added (e.g., via combined reduction processes of FIG. 3 and FIG. 4) into the preexisting aluminum (e.g., about 90 grams) in the cathode (420), thereby producing about 100 grams of Al—Sc alloy with about 2% weight in scandium. In another example, the process in FIG. 3 can start with about 80 grams of aluminum in the cathode (420), and about 18 grams of additional aluminum and about 2 grams of scandium can be added (e.g., via combined reduction processes of FIG. 3 and FIG. 4) into the preexisting aluminum (e.g., about 80 grams) in the cathode (420), thereby producing about 100 grams of Al—Sc alloy with about 2% weight in scandium.

Figure 5B:
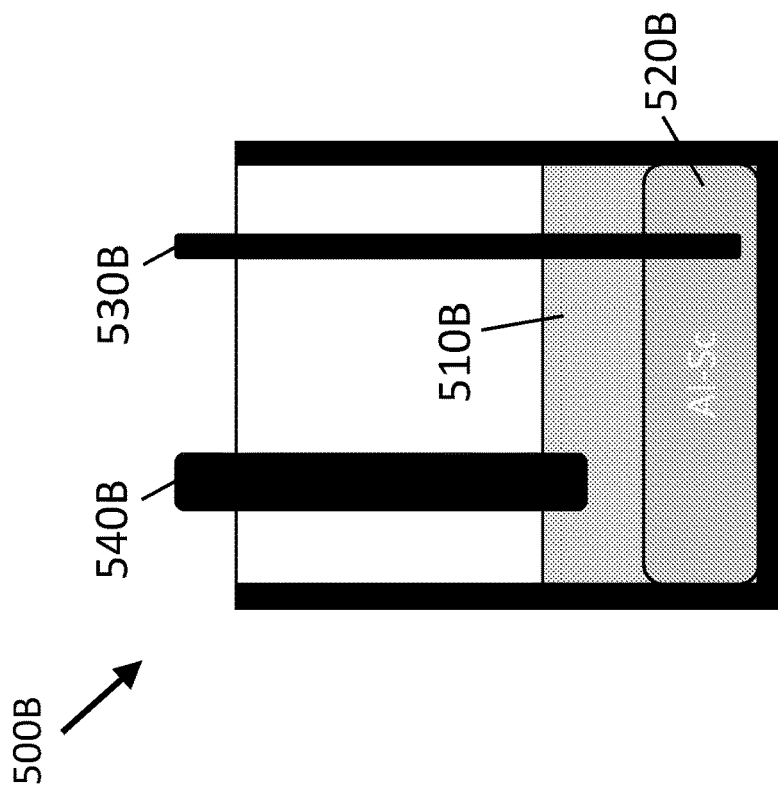
FIG. 5A and FIG. 5B show reduction cell designs for producing aluminum-scandium alloys according to embodiments of the present disclosure.
Figure 5A:
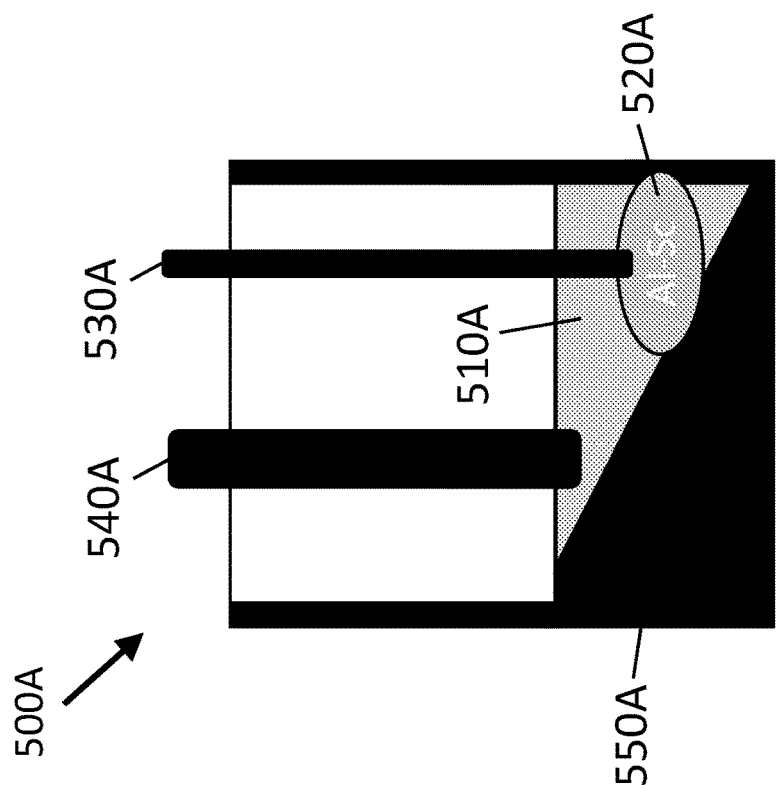

FIG. 5A and FIG. 5B show reduction cell designs for producing Al—Sc alloys according to embodiments of the present disclosure. In some embodiments, an reduction cell design (500A or 500B) can have a bath (510A or 510B) comprising $ScF_3$ and/or $AlF_3$, and at least one of LiF, NaF, and/or KF. In some embodiments, a reduction cell design (500A or 500B) can have an anode (540A or 540B), and a cathode comprising a conductor (530A or 530B) and Al—Sc (520A and 520B). A conductor (530A or 530B) can comprise any electrical conductor such as $TiB_2$. In some embodiments, as combined reduction processes within the reduction cell move forward, $Sc_2O_3$ can be added, and Al or/and Sc can be reduced into the cathode, thereby producing Al—Sc alloy (520A or 520B). In some embodiments, a slanted insert such as an iso-molded graphite slanted insert (550A) can be added at the bottom of the reduction cell (500A). For example, in a small-scale operation, adding a slanted insert may be preferred to pool the bath (510A) and the Al—Sc metal (520A) onto one side. In some embodiments, a reduction cell (500B) without a slanted insert can have higher salt volume, which can reduce error from composition draft. In some embodiments, a reduction cell (500B) without a slanted insert can increase anode immersion and can reduce anode shorting risk.

Figure 6:
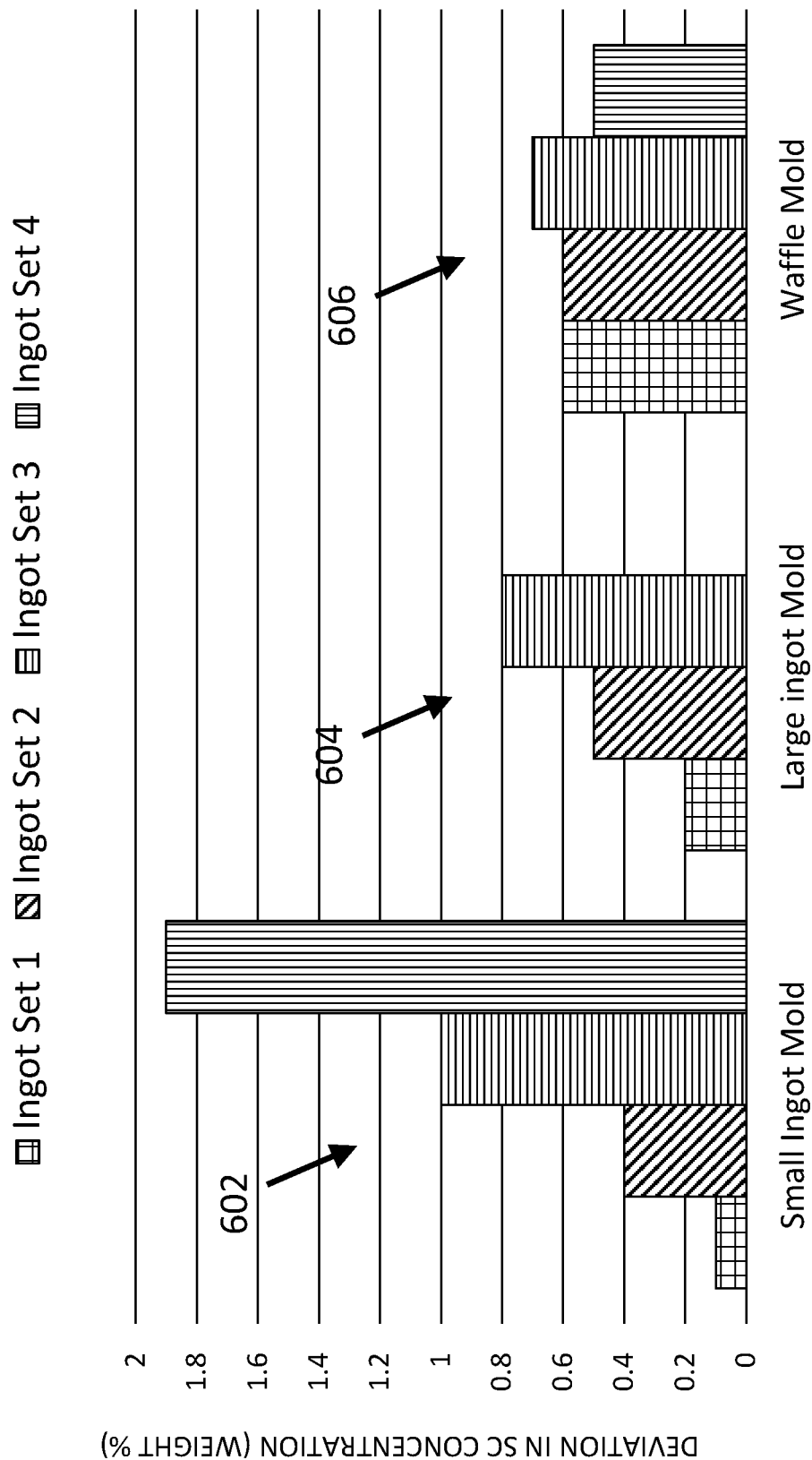
FIG. 6 shows deviation in Sc concentration in weight % in exemplary castings according to embodiments of the present disclosure.
Figure 7:
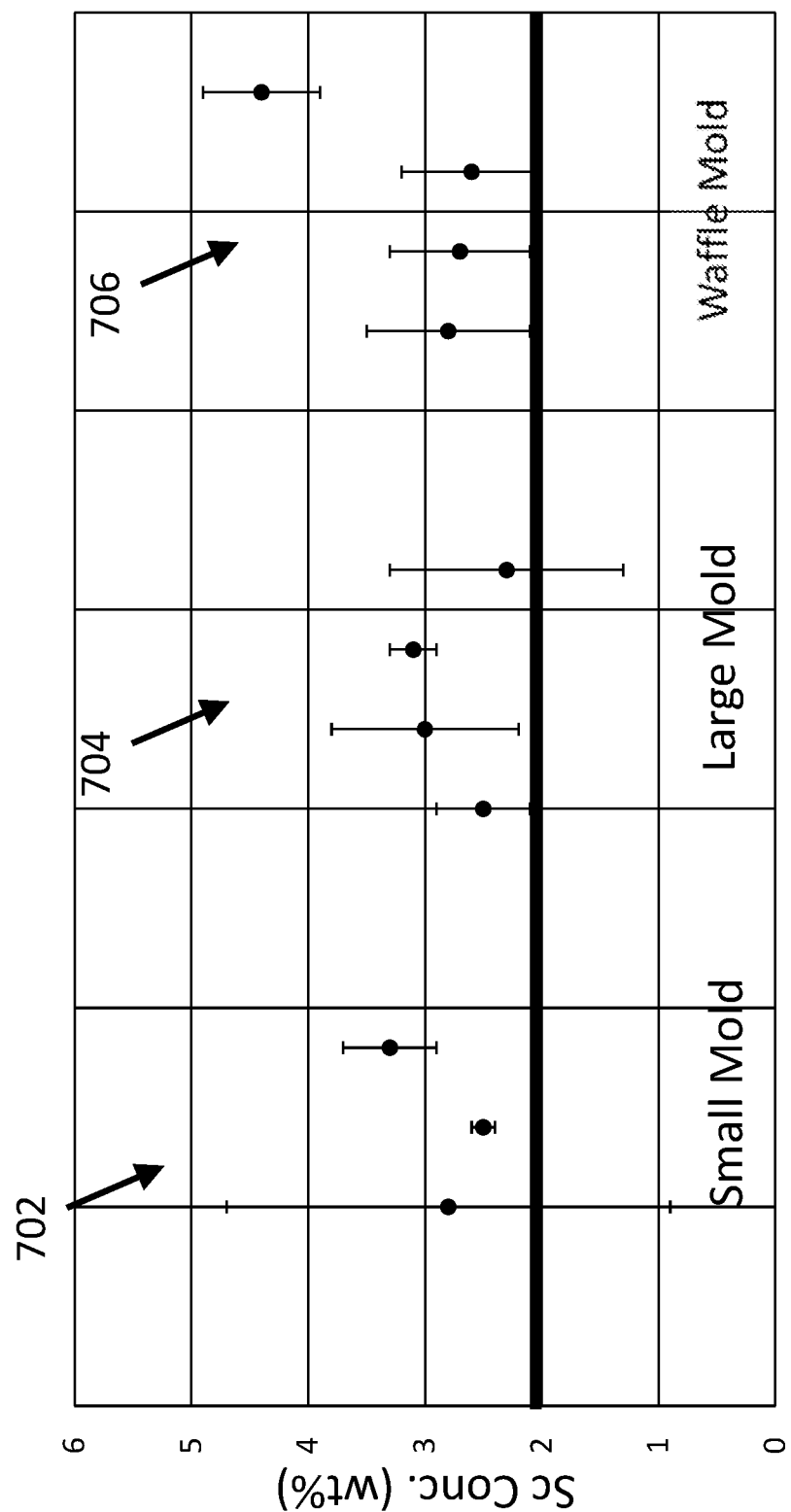
FIG. 7 shows Sc concentration in weight % in exemplary castings according to embodiments of the present disclosure.

FIG. 6 shows deviations in Sc concentration in wt % in exemplary castings according to embodiments of the present disclosure. FIG. 7 shows Sc concentration in wt % in exemplary castings according to embodiments of the present disclosure. In some embodiments, the combined reduction processes described herein can produce Al—Sc alloys in a liquid state (e.g., FIGS. 5A and 5B shows a cathode 520A and a cathode 520B comprising aluminum and scandium, which can be in a liquid state). In some embodiments the liquid Al—Sc alloys can be poured into a mold for casting, and the resulting Al—Sc alloy castings can be collected. For example, a small ingot mold can be used to cast a small Al—Sc alloy ingot (e.g., 602 and 702). In another example, a large ingot mold can be used to cast a large Al—Sc alloy ingot (e.g., 604 and 704). In another example, a waffle ingot mold can be used to cast a waffle Al—Sc alloy ingot (e.g., 606 and 706). In some embodiments, casting in different ingot molds can lead to slight variations in Al—Sc alloy ingot thickness, which can lead to variations in Sc distribution across ingots. In some embodiments, waffle casting can produce Al—Sc alloy ingots with more consistent Sc distribution across the Al—Sc alloy, and can allow a more consistent and repeatable casts.

Figure 8:
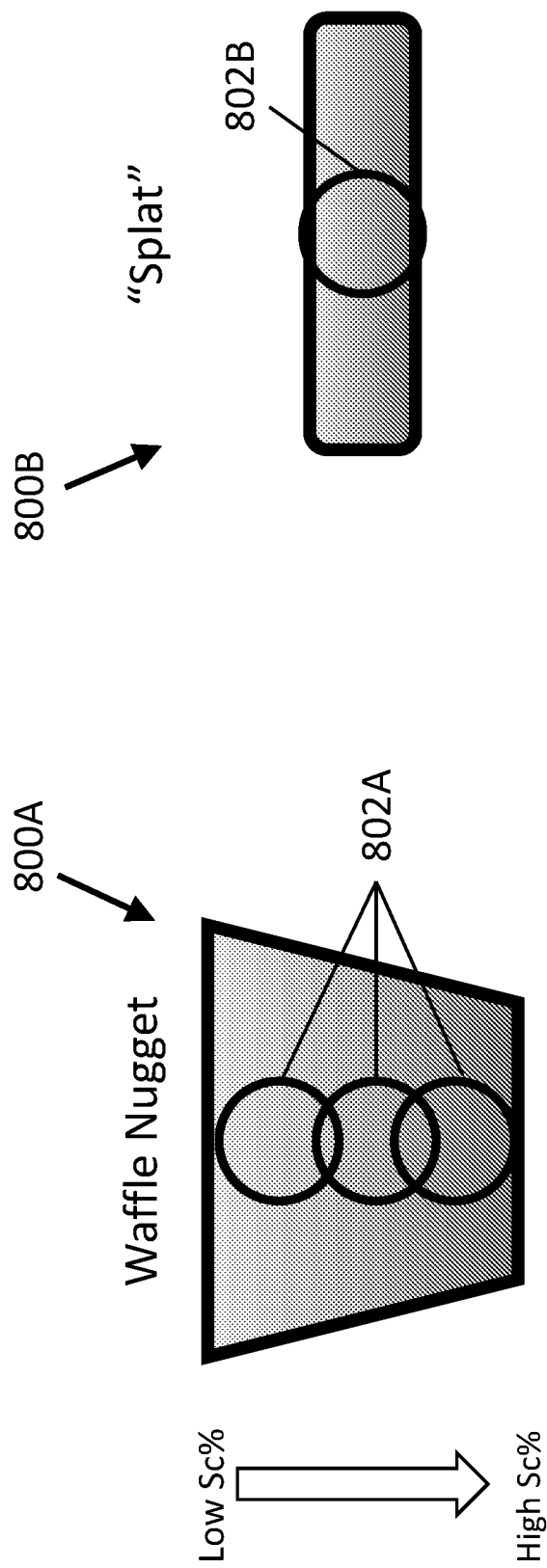
FIG. 8A and FIG. 8B show an analytical method of detecting Al—Sc composition according to embodiments of the present disclosure.

FIG. 8A and FIG. 8B show an analytical method of detecting Al—Sc composition according to embodiments of the present disclosure. In some embodiments, wt % Sc can be analyzed using an SEM-EDS (Scanning Electron Microscopy—Energy Dispersive X-Ray Spectroscopy) scanner. For example, in FIGS. 8A and 8B, the circles 802A and 802B indicate the area analyzed with SEM-EDS in a single scan. Three separate scans (802A) were performed to analyze and measure the scandium content of the waffle nugget (800A). In some embodiments, it may be desirable to analyze the entire thickness of the produced Al—Sc alloy casting for accurate composition. In some embodiments, thick Al—Sc alloy castings such as thick waffle ingot 800A can produce composition analytical with some error. In some embodiments, as illustrated in FIG. 8A, the Sc wt % can be higher on the bottom side of the mold casting. For example, as the liquid Al—Sc solidifies in the mold, heavier and denser Sc metal can sink to the bottom side of the cast, which can result in higher Sc wt % on the bottom side of the cast and lower Sc wt % on the top side of the cast. For example, the SEM-EDS scanning on the top side of the waffle nugget showed relatively lower Sc wt % when compared with the SEM-EDS scanning of the bottom side of the waffle nugget. In some embodiments, there can be other inconsistent distribution of Sc in the Al—Sc alloy ingots. In some embodiments, a small sample of the liquid Al—Sc alloy can be collected and rapidly solidified to form a "splat" cast (800B). In some embodiments, a splat cast (800B) can be thin, allowing for the entire thickness to be analyzed in a single scan, which can reduce error. For example, the SEM-EDS scanning of the splat cast can result in more accurate detection (or better representation) of the Al—Sc alloy's wt % Sc.

In some embodiments, a commercial operation can be run to produce an Al—Sc alloy with about 2 wt % or higher Sc. In some embodiments. the commercial operation can use a cathode comprising liquid aluminum and can electrolyze $Sc_2O_3$ to dissolve it in an exemplary $ScF_3$—$AlF_3$—NaF bath. As a reference, FIG. 1 shows an aluminum-scandium phase diagram, which indicates that at about 2 wt % scandium, the liquidus temperature can be about 800° C.

In some embodiments, the commercial operation can use a 250-800 Ampere cell, which can reduce about 100-250 g/hr Sc depending on current efficiency, and can produce about 5-12 kg/hr Al-2 wt % Sc alloy. In some embodiments, about 5-12 kg batches can be tapped every hour, or about 100 kg batches can be tapped once or twice/day. For example, a 40 cm ID crucible with about 120 kg metal (e.g., about 55 liters at density 2.2) can have 44 cm metal depth. An additional 20 kg molten salt bath (density 2.1) could have about 7.6 cm depth. In some embodiments, an approximate optimal bath composition, as described above, can be about 26.8 wt % $ScF_3$, about 24.6 wt % $AlF_3$, about 46.6 wt % NaF, and about 2 wt % $Sc_2O_3$. In some embodiments, the commercial operation steps can be as follows:

In some embodiments, the first step can be to melt, heat to about 1000° C. and charge 98 kg Al to the crucible, adding to 20 kg Al-2 wt % Sc already present, taking care to minimize mixing of bath into the metal.

In some embodiments, the next step can be to run electrolysis at about 250-800 Ampere (0.2-0.65 $A/cm^2$ on the bath-metal interface) for 8-20 hours, which can produce about 2 kg Sc at roughly about 45-90% current efficiency. In some embodiments, observed current efficiency, for example, can determine the electrolysis current and duration required for this batch size and tapping frequency. The 20 kg bath, for example, can contain just 400 g $Sc_2O_3$, and 3 kg $Sc_2O_3$ can be continuously added to produce the Al—Sc alloy over the course of the run.

In some embodiments, the next step can be to remove (e.g., siphon) about 100 kg Al-2 wt % Sc, leaving about 20 kg Al-2 wt % Sc behind in the cell (e.g., 20 kg Al-2 wt % Sc can be used to start the next commercial operation).

In some embodiments, a production rate of about 100-200 kg/day over about 250 days/year can correspond to about 25-50 tonnes/year of production from a single cell. In some embodiments, a 500 tonnes per year plant can have about ten of these cells, e.g., total current of about 5000-8000 A, cf. about 200 kA for co-reduction of all of the Al and Sc as described above.

EXAMPLES

Experiments 1-3: Producing 2 wt % Sc into Liquid Aluminum to Produce an Al—Sc Alloy with 2 wt % Sc (Al-2% Sc Alloy)

Three small-scale experiments were conducted with $ScF_3$—$AlF_3$—$NaF$—$Sc_2O_3$ bath. The first two experiments produced Al—Sc alloys with 2.0 wt % and 2.3 wt % of Sc. The third experiment produced two batches Al—Sc alloys with 3.42 wt % and 3.44 wt % of Sc.

Experimental Parameters for Experiments 1-3

Bath composition: $NaF$—$AlF_3$—$ScF_3$—$Sc_2O_3$.
Reference electrode: W wire inserted into a small BN cup containing Al-20 wt % Sc.
Crucible Temperature: 1000° C.

Experiment Procedures for Experiments 1-3 (Note: Experiments 1 and 2 were Stopped at Step 8)

1. Placed Al metal into the lower side of the crucible with slanted insert, and melted the Al metal in the glove box using the induction melter.
2. Premixed 300 g flux components in the chemical fume hood.
3. Prepared $TiB_2$ cathode, 0.375" OD graphite anode.
4. Placed the crucible in the cage.
5. Added pre-mixed bath powder to the crucible.
6. Placed cage with crucible into the cell, and heated up to 1000° C.
7. Withdrew small (about 1-3 g) samples of both bath and metal for analysis: LECO oxygen analysis for the bath and ICP-OES analysis for the metal.
8. Ran electrolysis at up to 8 V and up to 10 A, to approximately 15 Ah total charge, e.g., enough to reduce 6 g $Sc_2O_3$ at about 60% current yield.
9. Withdrew approximately 80 g of Al—Sc alloy using a steel ladle.
10. Withdrew a small (1-3 g) sample of bath for LECO oxygen analysis.
11. Fed 6 g $Sc_2O_3$, and stirred the bath until dissolved.
12. Added Al metal.
13. Repeated from steps 2-11 about 2-4 times.
14. Cooled to room temperature and disassembled.

Results and Discussions of Experiments 1-3

Experiments 1 and 2 used a custom crucible with stepped interior, creating a deep well for Al metal wrapped around the $TiB_2$ cathode connection, and a shallow ledge for the anode and reference electrode. Those experiments began with 15 g Al metal and 100 g bath.

In Experiment 1, the metal grew to 21 g with 2.0 wt % Sc. This likely indicated considerable Al electrowinning activity from the bath into the metal, along with Sc reduction (as illustrated in the reduction cell 200 of FIG. 2). However, the metal also had 5 wt % Fe, likely because there was originally not sufficient bath to immerse the anode, and adding more bath resulted in bath contact with the steel lead attached to the $TiB_2$ cathode.

In Experiment 2, a change in crucible geometry eliminated contact between the bath and steel lead. In this case, the metal grew to 17.5 g with 2.31 wt % Sc.

Experiment 3 used an isomolded graphite 5" OD, 4" depth with flat bottom, 20° iso-molded graphite slanted insert 550A (as illustrated in FIG. 5A) to pool metal on lower side. This held 300 g bath, with 100 g Al initially placed in the cell. There were two electrolysis runs with scandium oxide feed between them.

Observations and Measurements were as Follows:
Run 1 Step 7 bath and metal samples: Metal was Al-3.14 wt % Sc indicating some metallothermic reaction. Bath had 1.87% oxygen, which can correspond to 5.37 wt % $Sc_2O_3$, or the 2 wt % $Sc_2O_3$ added plus 2.50 wt % $Al_2O_3$ which could have come in as an impurity of the fluorides.

Run 1 Step 8 electrolysis: Ran to 17.5 Ah charge, observed a small amount of bubbling at the anode, which can be due to $CO_2$ evolution.

Run 1 Step 9 Al—Sc alloy withdrawal: Successful, pulled out 80 g Al-3.44 wt % Sc alloy, an 0.30 wt % increase in Sc vs. the initial concentration, corresponding to about 0.3 g Sc added by electrolysis. This differed from both Experiments 1 and 2 which both showed less Sc after electrolysis than both of these larger runs.

Run 1 Step 10 bath sample: Bath oxygen fell by 0.40 wt % e.g., 1.2 g oxide ions, corresponding to 4.0 A·h, indicating 23% current yield on the 17.5 A·h passed. The 0.3 g Sc added to the metal by electrolysis can consume 0.46 g $Sc_2O_3$ from the bath, corresponding to 0.05 wt % reduction in bath oxygen. Therefore, 0.35 wt % of the reduction in oxygen can correspond to 2.23 g $Al_2O_3$ reduction, making 1.18 g aluminum.

Run 1 Step 11 fed 6 g $Sc_2O_3$: Appeared to dissolve well.
Run 1 Step 12: Added 80 g Al metal, stirred with a graphite rod to agglomerate it with ~20 g existing metal remaining in the cell.

Run 2 Step 8 electrolysis: Ran to 14.7 A·h charge.
Run 2 Step 9 Al—Sc alloy withdrawal: Successful, pulled out 60 g Al-3.42 wt % Sc alloy, very close to that of Run 1 Step 9. About 2.7 g Sc entered the newly-added Al metal by some combination of metallothermic and electrolytic reactions.

Run 2 Step 10 bath sample: Bath had 1.23 wt % oxygen, which can indicate more oxide reduction than feed. Reduction of 0.24 wt % oxygen vs. Run 1 Step 10 corresponds to 0.72 g oxygen consumed from the bath, plus 2.09 g oxygen consumed from the 6 g $Sc_2O_3$ added in Run 1 Step 11, leading to 2.81 g oxygen consumed by electrolysis. This can correspond to 9.43 A·h charge, indicating 64% current efficiency on the 14.7 A·h passed.

In all, Experiment #3 produced about 140 g metal in the two runs with 3.42-3.44% Sc. Based on the amount fed and decline in bath oxygen concentration, 1.9 g oxygen from the original bath was consumed, corresponding to 5.4 g scandium oxide, or 3.5 g scandium. 4.8 g scandium entered the alloy, and about 73% of the scandium came from oxide reduction. Oxygen consumption indicated reduction of oxide from the bath, and similarity between the two runs demonstrated some repeatability.

Other Examples

FIG. 6 shows deviations in Sc concentration in wt % in exemplary castings according to embodiments of the present disclosure. The 4 samples of small ingot Al—Sc alloy castings (602) show relatively high deviation (e.g., when compared with the waffle castings) in Sc concentration of about 0.1, 0.4, 1 and 1.9, respectively. The 3 samples of large ingot Al—Sc alloy castings (604) also showed relatively high deviation (e.g., when compared with the waffle castings) in Sc concentration of about 0.2, 0.5, and 0.8, respectively. The 4 samples of waffle Al—Sc alloy castings (606) show relatively low deviation (e.g., when compared with the small or large mold castings) in Sc concentration of about 0.6, 0.6, 0.7, and 0.5, respectively.

FIG. 7 shows Sc concentration in wt % in exemplary castings according to embodiments of the present disclosure. The 3 samples of small mold Al—Sc alloy castings (702) showed inconsistent variations in Sc distribution across the alloys (e.g., when compared with the waffle castings). The first small mold sample showed Sc distribution across the alloy that varies from about 0.9 wt % to about 4.8 wt %, with an average Sc distribution of about 2.8 wt %. The second small mold sample showed little to no variation of Sc distribution across the alloy, with an average Sc distribution of about 2.5 wt %. The last small mold sample showed Sc distribution across the alloy that varies from about 2.9 wt % to about 3.8 wt %, with an average Sc distribution of about 3.4 wt %.

Continuing with FIG. 7, the 4 samples of large mold Al—Sc alloy castings (704) also showed inconsistent variations in Sc distribution across the alloys (e.g., when compared with the waffle castings). The first large mold sample showed Sc distribution across the alloy that varies from about 2 wt % to about 2.9 wt %, with an average Sc distribution of about 2.5 wt %. The second large mold sample showed Sc distribution across the alloy that varies from about 2.1 wt % to about 3.9 wt %, with an average Sc distribution of about 3 wt %. The third large mold sample showed little to no variation of Sc distribution across the alloy, with an average Sc distribution of about 3.1 wt %. The fourth large mold sample showed Sc distribution across the alloy that varies from about 1.2 wt % to about 3.2 wt %, with an average Sc distribution of about 2.2 wt %.

Continuing with FIG. 7, the 4 samples of waffle mold Al—Sc alloy castings (704) showed consistent variations in Sc distribution across the ingots (e.g., when compared with the small or large mold castings). The first waffle mold sample showed Sc distribution across the alloy that varies from about 2 wt % to about 3.6 wt %, with an average Sc distribution of about 2.8 wt %. The second waffle mold sample showed Sc distribution across the alloy that varies from about 2 wt % to about 3.3 wt %, with an average Sc distribution of about 2.7 wt %. The third waffle mold sample showed Sc distribution across the alloy that varies from about 2 wt % to about 3.2 wt %, with an average Sc distribution of about 2.6 wt %. The fourth waffle mold sample showed Sc distribution across the alloy that varies from about 3.9 wt % to about 4.9 wt %, with an average Sc distribution of about 4.4 wt %.

Continuing with FIG. 7, all of the casting samples (702, 704, and 706) showed average Sc wt % higher than 2 wt %. In 702, the first small mold sample's variation in Sc distribution was relatively high such that at least some portions of the sample showed less than 2 wt % Sc content. In 704, the fourth large mold sample's variation in Sc distribution was relatively high such that at least some portions of the sample showed less than 2 wt % Sc content. In 706, all four waffle mold samples showed consistent variation of Sc distribution across the alloys, and all of the analyzed portions of the waffle samples with the lowest Sc wt % stayed on or above 2 wt % Sc.

FIG. 8A and FIG. 8B show an analytical method of detecting Al—Sc composition according to embodiments of the present disclosure. In some embodiments, wt % Sc can be analyzed using an SEM-EDS (Scanning Electron Microscopy—Energy Dispersive X-Ray Spectroscopy) scanner. For example, in FIGS. 8A and 8B, the circles 802A and 802B indicate the area analyzed with SEM-EDS in a single scan. Three separate scans (802A) were performed to analyze and measure the scandium content of the waffle nugget (800A). In some embodiments, the Sc wt % can be higher on the bottom side of the mold casting. As the liquid Al—Sc solidifies in the mold, heavier and denser Sc metal can sink to the bottom side of the cast, which can result in higher Sc wt % on the bottom side of the cast and lower Sc wt % on the top side of the cast. For example, the SEM-EDS scanning on the top side of the waffle nugget showed relatively lower Sc wt % when compared with the SEM-EDS scanning of the bottom side of the waffle nugget. In some embodiments, a small sample of the liquid Al—Sc alloy can be collected and rapidly solidified to for a "splat" (800B), and the SEM-EDS scanning of the splat can result in more accurate detection of the Al—Sc alloy's wt % Sc.

Figure 9:
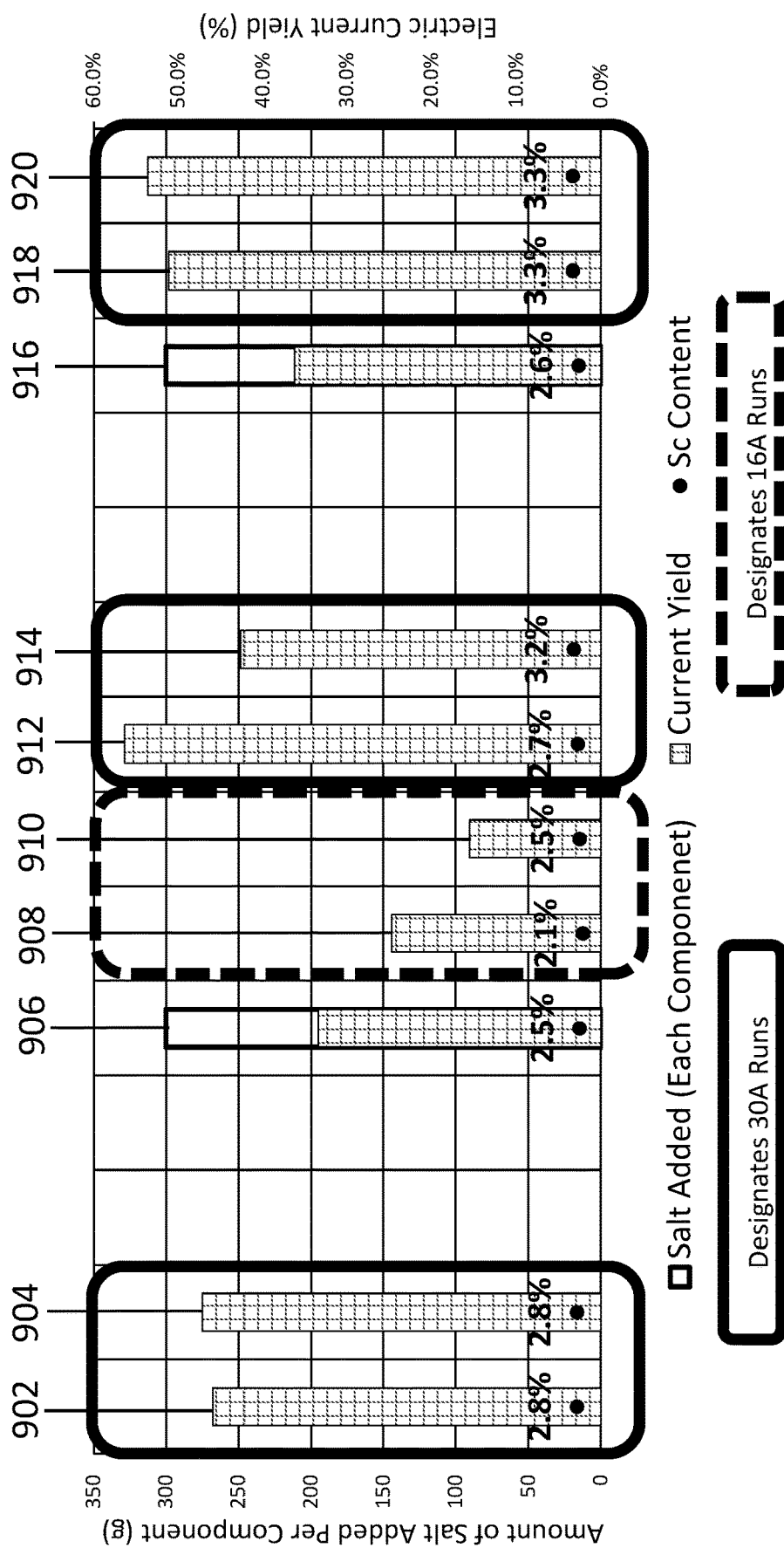
FIG. 9 shows sample Al—Sc alloys produced by applying different electric currents in reduction cell(s) according to embodiments of the present disclosure.

FIG. 9 shows Al—Sc alloy samples produced by applying different electric currents in reduction cell(s) according to embodiments of the present disclosure. During the experiments, two operating points were identified to produce Al—Sc alloys without producing $CF_4$ or sludge layers. The two operating points are cell operating between about 30-40 Amps, and the cell operating between about 14-18 Amps. The cell(s) were operated at these operating points, for example, to determine current yields and Sc concentration in the Al—Sc alloy. The Al—Sc alloy samples (902, 904, 912, 914, 918 and 920) were produced with 30 Amp electric current to the reduction cell (e.g., with inner diameter of about 4 inch), which produced Al—Sc alloys with about 2.7-3.3 wt % Sc with electric current yields ranging about 45-55%. The Al—Sc alloy samples (908 and 910) were produced with 16 Amp electric current to the reduction cell (e.g., with inner diameter of about 4 inch), which produced Al—Sc alloys with about 2.1-2.5 wt % Sc with electric current yields ranging about 18-29% During the 16 Amp runs, little or no gas evolution at the anode was observed, indicating that minimal electrolysis reaction took place. The 30 Amp electric current in the reduction cell (e.g., with inner diameter of about 4 inch) can translate to current density of about 0.4 $A/cm^2$, and the 16 Amp electric current in the reduction cell (e.g., with inner diameter of about 4 inch) can translate to current density of about 0.2 $A/cm^2$. For the samples 906 and 916, salt component(s) were added during the process.

As will be apparent to one of ordinary skill in the art from a reading of this disclosure, further embodiments of the present invention can be presented in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention. The scope of the invention is as set forth in the appended claims and equivalents thereof, rather than being limited to the examples contained in the foregoing description.

The invention claimed is:

1. A method of producing an aluminum-scandium (Al—Sc) alloy comprising a combination of metallothermic and electrolytic reactions, comprising:
   (a) providing an electrolyte bath comprising a first portion of $ScF_3$, $AlF_3$, and at least one of LiF, NaF, or KF;
   (b) providing a cathode in contact with the electrolyte bath, wherein the cathode comprises aluminum;
   (c) providing an anode in contact with the electrolyte bath;
   (d) adding a first portion of $Sc_2O_3$ into the electrolyte bath;
   wherein the metallothermic reactions comprise:
   (e) reacting an aluminum ion and a scandium ion at the cathode to produce the Al—Sc alloy; and
   wherein the electrolytic reactions comprise:
   (f) applying an electric current to the cathode, wherein an aluminum ion and a scandium ion react at the cathode to produce the Al—Sc alloy, and wherein after reacting the scandium ion at with the cathode:
   the electrolyte bath comprises $ScF_3$, $AlF_3$, and at least one of LiF, NaF, or KF, and
   the cathode comprises the Al—Sc alloy.

2. The method of claim 1, wherein the Al—Sc alloy comprises between 1-12 weight % scandium.

3. The method of claim 1, wherein the Al—Sc alloy comprises between 3-8 weight % scandium.

4. The method of claim 1, wherein at least a portion of the aluminum and the scandium in the cathode is a liquid.

5. The method of claim 1, wherein the electric current to the cathode has a current density of about 0.2-1.0 $A/cm^2$.

6. The method of claim 1, further comprising:
   maintaining a predetermined molar ratio of the scandium ion to the aluminum ion of 0:1 to 2:1, wherein the predetermined ratio is maintained by controlling the electric current to the cathode.

7. The method of claim 1, further comprising:
   maintaining a predetermined molar ratio of an oxygen ion to a fluoride ion of 1:20 to 1:250, wherein the predetermined ratio of the oxygen ion to the fluoride ion is maintained by:
   controlling the electric current, or
   adding a second portion of $Sc_2O_3$ into the electrolyte bath.

8. The method of claim 1, further comprising:
   maintaining a predetermined molar ratio of a lithium ion to the scandium ion and the aluminum ion of 0.5:1 to 4:1, wherein the predetermined molar ratio is maintained by adding a second portion of LiF.

9. The method of claim 1, further comprising:
   maintaining a predetermined molar ratio of a sodium ion to the scandium ion and the aluminum ion of 0.5:1 to 6:1, wherein the predetermined molar ratio is maintained by adding a second portion of NaF.

10. The method of claim 1, further comprising:
    maintaining a predetermined molar ratio of a potassium ion to the scandium ion and the aluminum ion of 0.5:1 to 6:1, wherein the predetermined molar ratio is maintained by adding a second portion of KF.

11. The method of claim 1, further comprising:
    adding a second portion of $Sc_2O_3$, $AlF_3$, and/or at least one of LiF, NaF, or KF into the electrolyte bath.

12. The method of claim 11, wherein the second portion of $Sc_2O_3$, $AlF_3$, and/or at least one of LiF, NaF, or KF are added such that the electrolyte bath comprises 17-38 weight % $ScF_3$, 15-28 weight % $AlF_3$, 43-weight % NaF, and 1-5 weight % $Sc_2O_3$.

13. The method of claim 11, wherein the second portion of $Sc_2O_3$, $AlF_3$, and/or at least one of LiF, NaF, or KF are added such that the electrolyte bath comprises 22-45 weight % $ScF_3$, 18-33 weight % $AlF_3$, 31-43 weight % LiF, and 1-6 weight % $Sc_2O_3$.

14. The method of claim 11, wherein the second portion of $Sc_2O_3$, $AlF_3$, and/or at least one of LiF, NaF, or KF are added such that the electrolyte bath comprises 14-32 weight % $ScF_3$, 12-24 weight % $AlF_3$, 51-63 weight % KF, and 1-5 weight % $Sc_2O_3$.

15. The method of claim 1, further comprising:
    adding a second portion of $Sc_2O_3$, $ScF_3$, $AlF_3$, and/or at least one of LiF, NaF, or KF into the electrolyte bath.

16. The method of claim 15, wherein the second portion of $Sc_2O_3$, $ScF_3$, $AlF_3$, and/or at least one of LiF, NaF, or KF are added such that the electrolyte bath comprises 17-38 weight % $ScF_3$, 15-28 weight % $AlF_3$, 43-55 weight % NaF, and 1-5 weight % $Sc_2O_3$.

17. The method of claim 15, wherein the second portion of $Sc_2O_3$, $ScF_3$, $AlF_3$, and/or at least one of LiF, NaF, or KF are added such that the electrolyte bath comprises 22-45 weight % $ScF_3$, 18-33 weight % $AlF_3$, 31-43 weight % LiF, and 1-6 weight % $Sc_2O_3$.

18. The method of claim 15, wherein the second portion of $Sc_2O_3$, $ScF_3$, $AlF_3$, and/or at least one of LiF, NaF, or KF are added such that the electrolyte bath comprises 14-32 weight % $ScF_3$, 12-24 weight % $AlF_3$, 51-63 weight % KF, and 1-5 weight % $Sc_2O_3$.

* * * * *

UNITED STATES PATENT AND TRADEMARK OFFICE
CERTIFICATE OF CORRECTION

| | | |
|---|---|---|
| PATENT NO. | : 11,970,782 B2 | Page 1 of 1 |
| APPLICATION NO. | : 16/980957 | |
| DATED | : April 30, 2024 | |
| INVENTOR(S) | : Adam Clayton Powell et al. | |

It is certified that error appears in the above-identified patent and that said Letters Patent is hereby corrected as shown below:

In the Specification

Column 1, Line 23, following the CROSS-REFERENCE TO RELATED APPLICATIONS section and prior to the heading FIELD OF THE INVENTION insert:
--This invention was made with Government support under contract number DE-AR0000412 awarded by The U.S. Department of Energy, Office of ARPA-E. The Government has certain rights in the invention.--

Signed and Sealed this
Thirtieth Day of December, 2025

John A. Squires
*Director of the United States Patent and Trademark Office*